(12) United States Patent
Shimada

(10) Patent No.: US 8,172,013 B2
(45) Date of Patent: May 8, 2012

(54) LEGGED ROBOT AND CONTROL METHOD OF LEGGED ROBOT

(75) Inventor: Hiroshi Shimada, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 443 days.

(21) Appl. No.: 12/594,088

(22) PCT Filed: Oct. 22, 2008

(86) PCT No.: PCT/IB2008/003245
§ 371 (c)(1),
(2), (4) Date: Sep. 30, 2009

(87) PCT Pub. No.: WO2009/053838
PCT Pub. Date: Apr. 30, 2009

(65) Prior Publication Data
US 2010/0126785 A1    May 27, 2010

(30) Foreign Application Priority Data
Oct. 25, 2007  (JP) .................................. 2007-278107

(51) Int. Cl.
*B62D 51/06*   (2006.01)
*G05B 19/00*   (2006.01)
(52) U.S. Cl. .............. 180/8.1; 180/8.6; 901/1; 700/245; 700/260
(58) Field of Classification Search .................... 180/8.1, 180/8.6; 901/1; 700/245, 260
See application file for complete search history.

(56) References Cited

U.S. PATENT DOCUMENTS

| 6,992,457 B2 * | 1/2006 | Furuta et al. ............. 318/568.12 |
| 7,266,424 B2 * | 9/2007 | Lee et al. ...................... 700/245 |
| 2004/0205417 A1 | 10/2004 | Moridaira et al. |
| 2005/0151497 A1 | 7/2005 | Nagasaka |

FOREIGN PATENT DOCUMENTS

| EP | 1 475 193 A1 | 11/2004 |
| EP | 1 477 283 A1 | 11/2004 |
| JP | 2001-353686 A | 12/2001 |
| JP | 2003-236782 A | 8/2003 |
| JP | 2004-090194 A | 3/2004 |
| JP | 3569768 | 3/2004 |
| JP | 3574952 | 7/2004 |
| JP | 2004-345024 A | 12/2004 |
| JP | 2005-074620 A | 3/2005 |
| JP | 2005-219204 A | 8/2005 |

* cited by examiner

*Primary Examiner* — Joanne Silbermann
*Assistant Examiner* — Marlon Arce
(74) *Attorney, Agent, or Firm* — Kenyon & Kenyon LLP

(57) ABSTRACT

A legged robot includes: a body; a leg portion; a foot portion; a falling direction detection unit that detects a falling direction of the body; a control unit; and a distance detection unit that detects a distance between a sole of the foot portion and a road surface. The distance detection unit includes at least three distance sensors provided on the sole, and the control unit includes distance sensor selecting means for selecting a distance sensor and gait data correcting means for correcting gait data based on a detection signal from the distance sensor selected by the distance sensor selecting means. The distance sensor selecting means selects three distance sensors among the distance sensors based on a detection result of the falling direction detection unit.

10 Claims, 19 Drawing Sheets

F I G . 6A
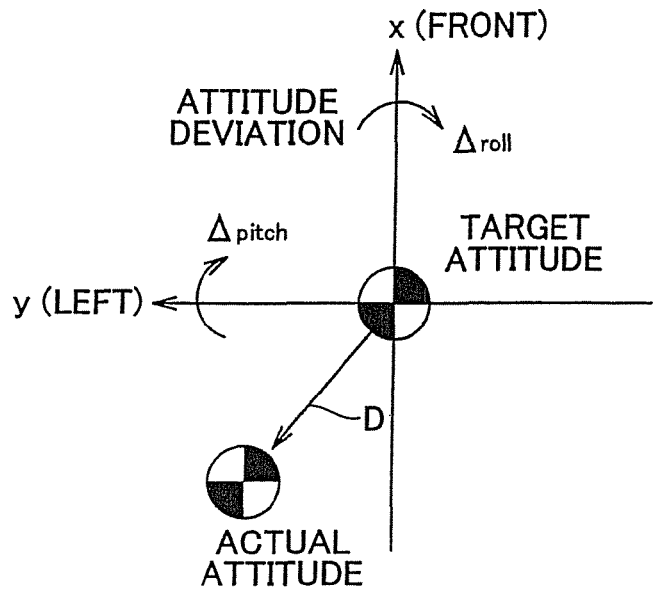
F I G . 6B
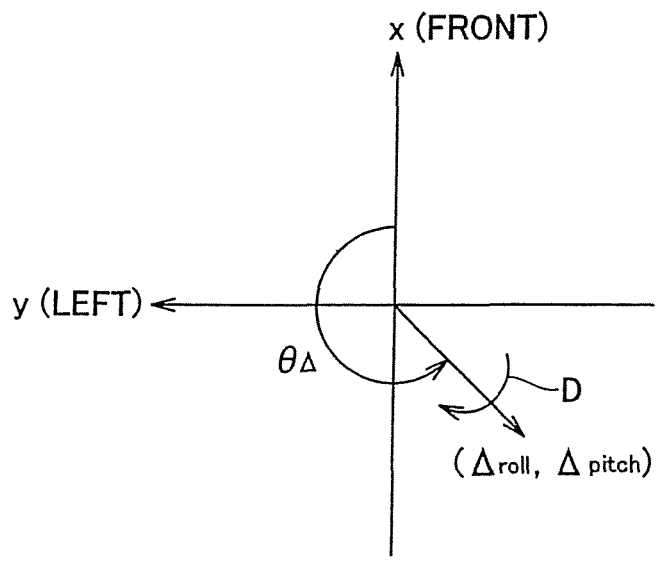

FIG. 8

$\Delta \phi$ → [ $C\phi(s)$ ] → FOOT CORRECTION AMOUNT (ROLL)

$\Delta \theta$ → [ $C\theta(s)$ ] → FOOT CORRECTION AMOUNT (PITCH)

$\Delta z$ → [ $Cz(s)$ ] → FOOT CORRECTION AMOUNT (z)

LEGGED ROBOT AND CONTROL METHOD OF LEGGED ROBOT

This is a 371 national phase application of PCT/IB2008/003245 filed 22 Oct. 2008, claiming priority to Japanese Patent Application No. 2007-278107 filed 25 Oct. 2007, the contents of which are incorporated herein by reference.

BACKGROUND OF THE INVENTION

1. Field of the Invention

The invention relates to a legged robot and a control method of the legged robot.

2. Description of the Related Art

To ensure that a legged mobile robot moves with stability and without falling over, a supporting leg of the robot must be brought into close contact with a road surface. It is also desirable to suppress unforeseen outside disturbance forces from road surface irregularities when a lifted leg of the robot is grounded. It is therefore important to control the relationship between the soles of the robot and the road surface in accordance with a target.

In related art, many techniques of disposing a sensor on the soles of the robot and aligning an output value of the sensor with a target value have been proposed. Japanese Patent No. 3574952 discloses a bipedal movement device and a walking control device for the device that detects a floor reaction force on the sole of the foot, thereby realizing walking stability even on an unstable road surface having complicated irregularities. In the bipedal movement device described in Japanese Patent No. 3574952, three sensors are selected from among at least three triaxial force sensors disposed on the sole in descending order of the force detected thereby, and the gait is corrected based on corresponding floor reaction force data.

Japanese Patent No. 3569768 discloses a bipedal movement device with which a foot portion can be grounded securely even on an unstable road surface having complicated irregularities. In the bipedal movement device described in Japanese Patent No. 3569768, a triaxial force sensor is provided on a heel portion and a toe portion, and based on signals from these force sensors, gait data are corrected such that three-point support is achieved by the heel portion and the toe portion.

Japanese Patent Application Publication No. 2001-353686 (JP-A-2001-353686) discloses a foot portion structure for a legged mobile robot and a road surface detection apparatus for accurately determining the condition of a road surface and the grounding condition of a foot portion while the legged mobile robot is walking. The foot portion structure for a legged mobile robot described in JP-A-2001-353686 includes a foot portion base body and a road surface detection unit disposed on the bottom face of the foot portion base body to measure the approach of the foot portion to the road surface and the grounding condition of the foot portion. A road surface detector is attached to the foot portion base body to be free to emerge therefrom, and a road surface detection unit detects the emergence position of the road surface detector. JP-A-2001-353686 also discloses means for achieving stability by feedback-controlling the distance between the sole and the road surface using a sole distance sensor.

However, with the techniques described in Japanese Patent No. 3574952 and Japanese Patent No. 3569768, it may be impossible to obtain the floor reaction force accurately when more than three sensors come into contact with the road surface. In this case, it may be impossible for all of the sensors to contact the road surface, depending on the road surface condition, leading to an increase in the number of triaxial force sensors that cannot be used to calculate the floor reaction force, and as a result, the floor reaction force cannot be detected accurately. Further, when three sensors are used, an actual convex closure foamed by a contact part between the sole and the road surface decreases in size, leading to a reduction in the size of a stable region in which a Zero Moment Point (to be referred to simply as "ZMP" hereafter) can exist, and as a result, the robot is more likely to fall over. The robot is also more likely to slide in a yaw direction. Hence, providing more than three sensors leads to redundancy, while three sensors are insufficient. For practical purposes, therefore, only a case in which four sensors are provided, as shown in the embodiments, is effective.

Furthermore, with the technique described in JP-A-2001-353686, the distance between the road surface and the sole in the sensor position cannot physically be set at zero when a part other than the sensor contacts the road surface. In other words, it may be impossible to set a measurement height value of all of the distance sensors at zero, depending on the road surface condition.

When controlling the distance relationship between the sole of the robot and the road surface in accordance with a target, the distance sensor is preferably disposed as close to the outer periphery of the sole as possible in order to improve stability. Further, distance sensors are preferably disposed in the four corners to increase the size of the convex closure of the contact portion between the sole and the road surface to a maximum. However, considering that a plane is determined by three points, one contact location between the road surface and the sensor becomes redundant if distance sensors are disposed in the four corners. If the number of distance sensors is redundant, the values of all of the distance sensors cannot be set at desired values when the sole of the robot steps on a complicated irregularity. As shown in FIG. 18, for example, when a part of a foot portion 26 of the robot steps on an obstacle B (i.e. when a point 16a on the rear surface of the foot portion 26 is positioned on the obstacle B), points 16c and 16a of the sole are able to contact the road surface, but points 16b and 16d cannot contact the road surface simultaneously. In other words, when the points 16c and 16a of the sole contact the road surface, the sole rotates about an axis C located on a diagonal passing through the points 16a and 16c, leading to instability. Hence, it may be impossible to bring all four points on the sole of the supporting leg into close contact with the road surface, depending on the irregularity condition of the road surface. When control is performed in this case to align the values of all of the sole distance sensors with desired values, for example when the sole is corrected to minimize a square error of the distance, control may be performed to an extremely unstable condition, for example such that the sole lands on the road surface on the diagonal. In other words, when an attempt is made to align the values of all of the distance sensors with target values, an unstable condition may conversely be maintained. Hence, when the trunk of the robot tilts while the sole is not in close contact with the road surface, the robot is unable to obtain a floor reaction force moment for correcting the tilt and may fall over as a result. To prevent the robot from falling over, it is necessary to choose the distances that are to be aligned with the target values from among the distances of the sole distance sensors provided on the supporting leg.

The floor reaction force moment required to correct the tilted trunk can be obtained by appropriately selecting the sole distance sensors to be aligned with a target height. In a constitution where only three sole distance sensors are selected, it may be impossible to bring the sole of the supporting leg into close contact with the road surface depending on the falling direction of the trunk, leading to instability. As shown in FIG. 19, for example, when one distance sensor 16d steps on a projection on the road surface such that three sole distance sensors 16a, 16b, 16c are selected from a detected falling direction D, the sole distance sensors 16a and 16c cannot contact the road surface simultaneously, and therefore the sole of the supporting leg cannot be aligned completely. The reason for this is that when the tilt direction of the trunk of the robot and the direction of an irregularity on the road surface are close, control is performed such that the sole lands on the road surface on a diagonal, similarly to the case described above, leading to an unstable condition.

Hence, according to the legged robots in the related art, because it is difficult to maintain contact between the sole and the road surface while effectively obtaining a floor reaction force moment for causing the trunk of the robot to an inverted pendulum state, the robot might not walk with stability and without falling over depending on the road surface condition.

SUMMARY OF THE INVENTION

The invention provides a legged robot and a control method of the legged robot with which contact between a sole and a road surface is maintained while effectively obtaining a floor reaction force moment for righting a trunk of the robot, even on uneven ground.

A first aspect of the invention is a legged robot having: a body; a leg portion connected to the body; a foot portion provided on a lower end of the leg portion; a falling direction detection unit that detects a falling direction of the body; a control unit that controls drive of a joint of the leg portion based on gait data; and a distance detection unit that detects a distance between a sole of the foot portion and a road surface. The distance detection unit includes at least three distance sensors provided on the sole of the foot portion. The control unit includes distance sensor selecting means for selecting a distance sensor and gait data correcting means for correcting the gait data based on a detection signal from the distance sensor selected by the distance sensor selecting means. The distance sensor selecting means selects three distance sensors among the distance sensors based on a detection result of the falling direction detection unit.

By detecting the falling direction of the trunk of the robot and selecting three sole distance sensors for attaining a target value based on the detection result, contact between the sole and the road surface can be maintained while effectively obtaining a floor reaction force moment for righting the trunk (body) of the robot. Hence, by receiving the floor reaction force moment from the sole while keeping a supporting leg in close contact with the floor surface, stabilization control for righting the trunk of the robot can be executed easily, and as a result, the legged robot can walk over uneven ground without falling over. Note that the gait data are data for causing the robot to walk, and include a target position/attitude of the body and a target position/attitude of the foot portion. The legged robot according to the invention is caused to perform a walking operation by first bringing the foot part of the leg portion into contact with a floor surface so as to serve as a supporting leg, and then driving the leg portion such that the floor surface is pushed by the sole of the foot, thereby lifting up the entire leg portion (the entire robot). The driven leg portion becomes a lifted leg and the other leg portion becomes the supporting leg, and by switching the lifted leg and supporting leg repeatedly, a walking operation can be performed.

Further, the distance sensor selecting means may select a first distance sensor and a second distance sensor among the distance sensors based on the detection result of the falling direction detection unit, and may select a third distance sensor among the unselected distance sensors based on the distance between the sole of the foot portion and the road surface.

Further, the third distance sensor may be a distance sensor, among the unselected distance sensors, in which the distance between the sole of the foot portion and the road surface is smallest.

The control unit may calculate a deviation value between the sole and the road surface based on detection signals from all of the selected distance sensors, and calculates a foot correction amount for correcting the gait data by using the deviation value.

Further, the control unit may determine whether a walking operation pattern of the leg portion is a supporting leg walking operation pattern or a lifted leg walking operation pattern, and vary the number of distance sensors to be selected by the distance sensor selecting means based on a determination result of the walking operation pattern of the leg portion.

Further, when the leg portion is a supporting leg, the control unit may determine whether the sole of the leg portion is completely grounded on the road surface based on an output signal from the distance detection unit. The distance sensor selecting means may select three distance sensors among the distance sensors based on the detection result of the falling direction detection unit when the sole of the leg portion is completely grounded on the road surface, and select all of the distance sensors when the sole of the leg portion is not completely grounded on the road surface.

When the leg portion is a supporting leg, the control unit may determine whether the sole of the leg portion is completely grounded on the road surface based on the gait data.

When the leg portion is a lifted leg, the control unit may determine whether the sole of the leg portion is completely lifted off the road surface based on the output signal of the distance detection unit. The distance sensor selecting means may select three distance sensors among the distance sensors based on the detection result of the falling direction detection unit when the sole of the leg portion is not completely lifted off the road surface, and select all of the distance sensors when the sole of the leg portion is completely lifted off the road surface.

When the leg portion is a lifted leg, the control unit may determine whether the sole of the leg portion is completely lifted off the road surface based on the gait data.

A second aspect of the invention is a control method of a legged robot which includes a body, a leg portion connected to the body, a foot portion provided on a lower end of the leg portion, a falling direction detection unit that detects a falling direction of the body, and at least three distance sensors that detects a distance between a sole of the foot portion and a road surface. This control method includes: selecting a first distance sensor and a second distance sensor among the distance sensors based on a detection result of the falling direction detection unit; selecting a third distance sensor among the unselected distance sensors based on the distance between the sole of the foot portion and the road surface; and controlling drive of a joint of the leg portion based on the gait data by correcting gait data based on detection signals from the selected distance sensors.

By detecting the falling direction of the trunk of the robot and selecting three sole distance sensors for attaining a target value based on the detection result, contact between the sole and the road surface can be maintained while effectively obtaining a floor reaction force moment for righting the trunk of the robot. Hence, by receiving the floor reaction force moment from the sole while keeping the supporting leg in close contact with the floor surface, stabilization control for righting the trunk of the robot can be executed easily, and as a result, the legged robot can walk over uneven ground without falling over.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a view illustrating processing that detects a falling direction of the legged robot according to the first embodiment of the invention;

FIG. 8 is a view illustrating transfer functions according to the first embodiment of the invention;

DETAILED DESCRIPTION OF EMBODIMENTS

A legged robot according to a first embodiment includes a body, a leg portion connected to the body, a foot portion provided on a lower end of the leg portion, a falling direction detection unit that detects a falling direction of the body, a control unit that controls drive of a joint of the leg portion, and a distance detection unit that detects a distance between a sole of the foot portion and a road surface. Here, the distance detection unit includes at least three distance sensors provided on the sole of the foot portion. The control unit of the legged robot includes distance sensor selecting means for selecting a distance sensor, and gait data correcting means for correcting gait data based on a detection signal from the distance sensor selected by the distance sensor selecting means. The distance sensor selecting means selects three distance sensors from among the distance sensors based on a detection result from the falling direction detection unit.

When the walking robot walks on uneven ground, stabilization control is realized by combining sole alignment control to align the sole with the road surface using the distance sensors provided on the sole, and inverted pendulum control for righting the attitude of the robot using an attitude sensor. When the number of sole distance sensors used in the sole alignment control is redundant and an attempt is made to treat all of the sensors equally, instability occurs, and as a result, the robot may fall over. According to the legged robot of the first embodiment, activated sensors are selected appropriately from the redundant sole distance sensors in accordance with the robot condition, the sensor condition, and the walking condition, and therefore the legged robot can walk on uneven ground with stability and without falling over.

Figure 1:
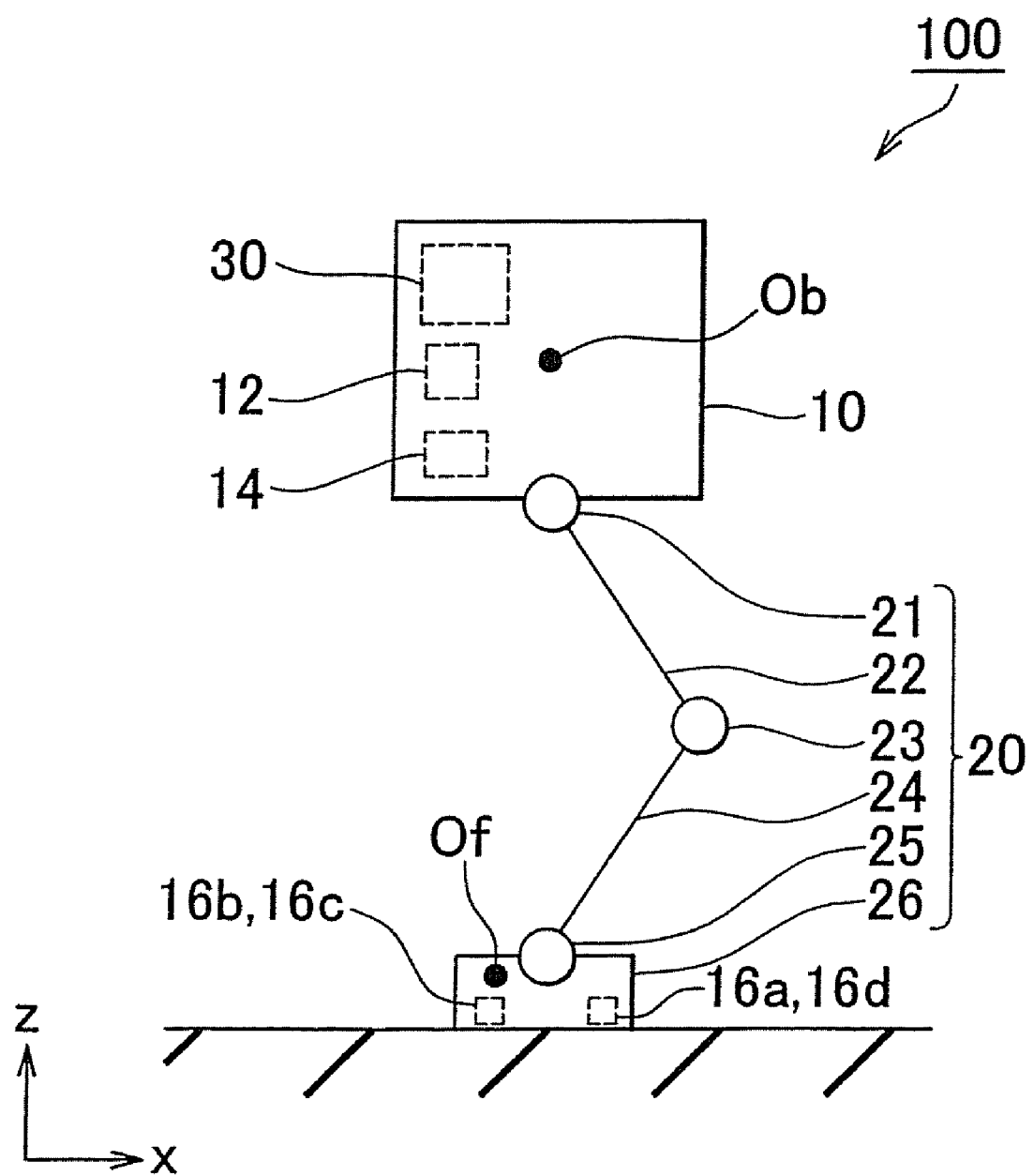
FIG. 1 is a constitutional diagram of a legged robot according to a first embodiment of the invention.

A control method of the robot according to the first embodiment will be described below with reference to the drawings. FIG. 1 is a view showing an outline of the legged robot according to the first embodiment. A robot 100 includes a body 10, and two legs connected to the body 10. Note that in FIG. 1, only one leg portion 20 is shown and the other leg portion is omitted from the drawing. The body 10 includes a control unit 30 for controlling an operation (an operation of each joint of the leg portion) of the robot 100, an acceleration sensor 12 that detects the acceleration of the body, and an attitude angle sensor 14 that detects a tilt angle (attitude angle) of the body 10 relative to a vertical direction.

The leg portion 20 includes a hip joint 21, a knee joint 23, an ankle joint 25, a thigh link 22, a tibia link 24, and a foot link 26 serving as a foot portion. The thigh link 22 and the tibia link 24 are schematically illustrated with straight lines. The hip joint 21 is swingably connected to the body 10 and the thigh link 22. The knee joint 23 is swingably connected to the thigh link 22 and the tibia link 24. The ankle joint 25 is swingably connected to the tibia link 24 and the foot link 26. The foot link 26 serving as the foot portion is provided on a lower end of the leg portion 20. The foot link 26 is a plate-form member, and a rear surface (sole surface) of the foot link is planar.

Figure 2:
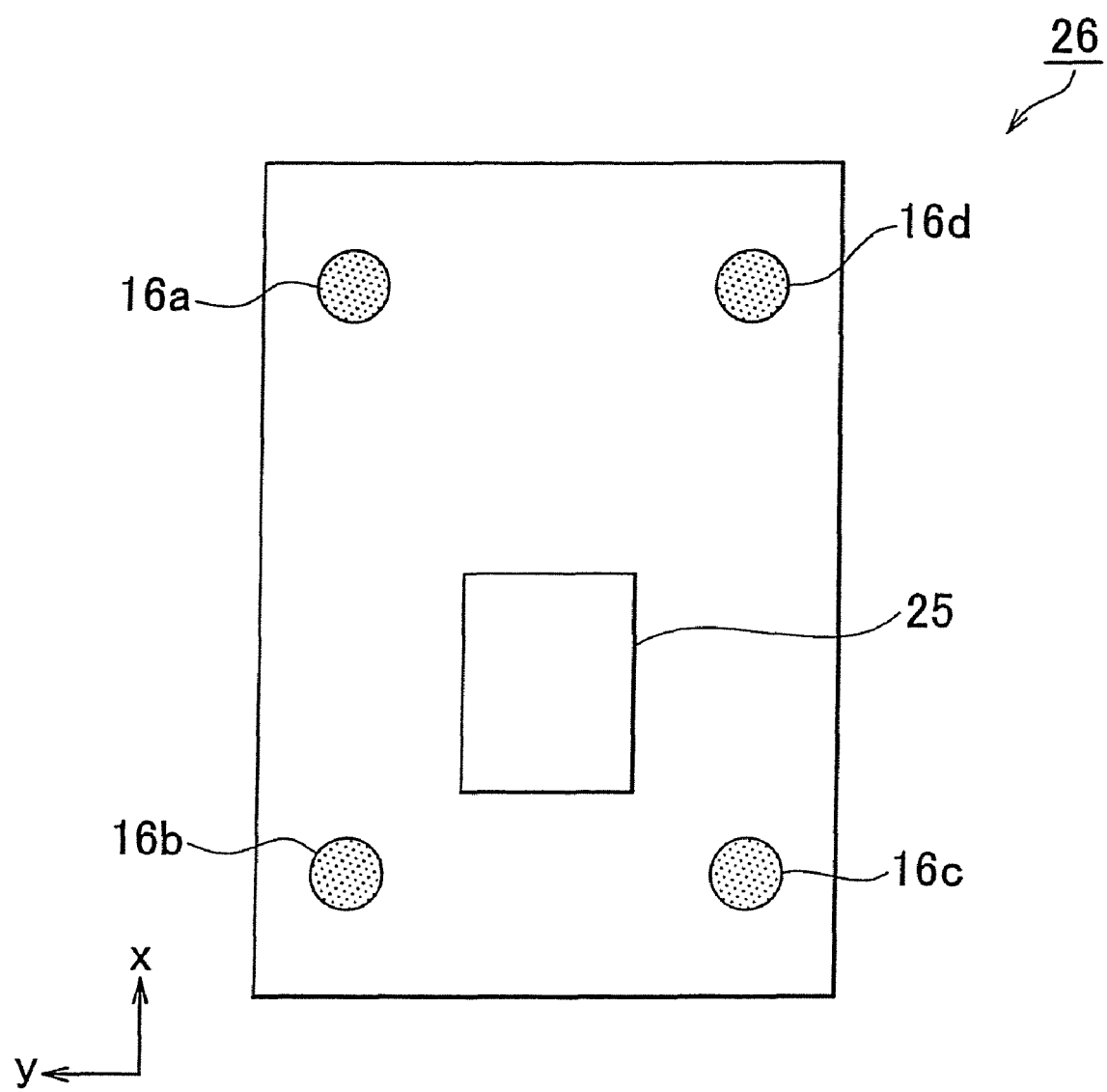
FIG. 2 is a constitutional diagram of a foot link of the legged robot according to the first embodiment of the invention.

At least three distance sensors 16 are provided on the foot link 26 as a distance detection unit. The distance sensors 16 detect the distance between the rear surface (sole surface) of the foot link 26 and a ground surface S. FIG. 2 is a view illustrating the constitution of the foot link 26. As shown in FIG. 2, the foot link 26 is substantially rectangular from a top view. Four distance sensors 16a, 16b, 16c, 16d are provided respectively near the four corners of the foot link 26. Here, two distance sensors 16*a* and 16*d* are provided on a toe side of the foot link 26 and two distance sensors 16*b* and 16*c* are provided on a heel side. The distance sensors 16*a* and 16*d* detect the distance between the sole surface and the ground surface S in a predetermined position at the front of the foot link 26, while the distance sensors 16*b* and 16*c* detect the distance between the sole surface and the ground surface S in a predetermined position at the rear of the foot link 26. Thus, a tilt of the sole surface of the foot link 26 relative to the ground surface S can be determined from differences between the distances detected by the distance sensors 16*a* and 16*d* and the distances detected by the distance sensors 16*b* and 16*c*.

A motor, not shown in the drawings, is built into each joint and driven based on a command from the control unit 30. By driving the motor, the links connected to the joints can be swung. The other leg portion not shown in the drawing has an identical structure to the leg portion 20. By causing the control unit 30 to control the joints (more specifically, joint angles) of the two leg portions appropriately, the robot 100 can be caused to walk.

In FIG. 1, for ease of description, an advancing orientation of the robot 100 (a front-rear direction) is set as an x axis, an orientation that intersects the advancing direction of the robot 100 in a horizontal direction (a left-right direction) is set as a y axis, and an orientation extending in a vertical direction from an advancement plane of the robot 100 (an up-down direction) is set as a z axis, and description will be provided using an absolute coordinate system constituted by these three axes. In FIG. 1, the x axis indicates a left-right direction along the paper surface, the y axis indicates a depth direction of the paper surface, and the z axis indicates an up-down direction along the paper surface. Note that a point Ob is specified and fixed in relation to the body 10 of the robot 100, and a point Of is specified and fixed in relation to the foot link 26.

The robot 100 is controlled based on gait data stored in the control unit 30. The gait data include time series data relating to each of a target position of the body 10 (target body position), a target attitude angle of the body 10 (target body attitude angle), a target position of the foot link 26 (target foot position), and a target attitude angle of the foot link 26 (target foot attitude angle). The gait data also include time series data relating to the respective target foot positions and attitude angles of the leg portions of the robot 100.

The gait data are created through simulation or the like such that the robot 100 can walk with stability. More specifically, the target body position, target body attitude angle, target foot position, and target foot attitude angle are set to satisfy a relationship according to which a ZMP position of the robot 100 falls within a convex closure surrounded by the sole when in contact with a ground surface. The created gait data are stored in the control unit 30 of the robot 100. As will be described below, the control unit 30 controls each joint such that the actual body position and so on matches the target body position and so on included in the gait data.

The target body position is indicated by the position of the specific point Oh relative to the absolute coordinate system. When a body coordinate system having the specific point Ob as an origin is used, the target body attitude angle is indicated by an inclination of the body coordinate system relative to the absolute coordinate system. The actual body attitude angle can be detected by the attitude angle sensor 14 provided in the body 10. The target foot position is represented by the position of the specific point Of relative to the absolute coordinate system. The target foot attitude angle is represented by the angle of the sole surface relative to the ground surface. When a foot coordinate system having the specific point Of as an origin is used, the target foot attitude angle may be indicated by an inclination of the foot coordinate system relative to the absolute coordinate system. As will be described below, the actual foot attitude angle can be detected by the distance sensors 16 provided on the foot link 26.

Next, an operation of the control unit 30 will be described in detail. The control unit 30 executes righting control and alignment control. In the righting control, the actual body position and actual body attitude angle are matched to the target body position and target body attitude angle, respectively. In the alignment control, the relative actual foot position and actual foot attitude angle seen from the ground surface are matched to the target foot position and target foot attitude angle, respectively.

Figure 3:
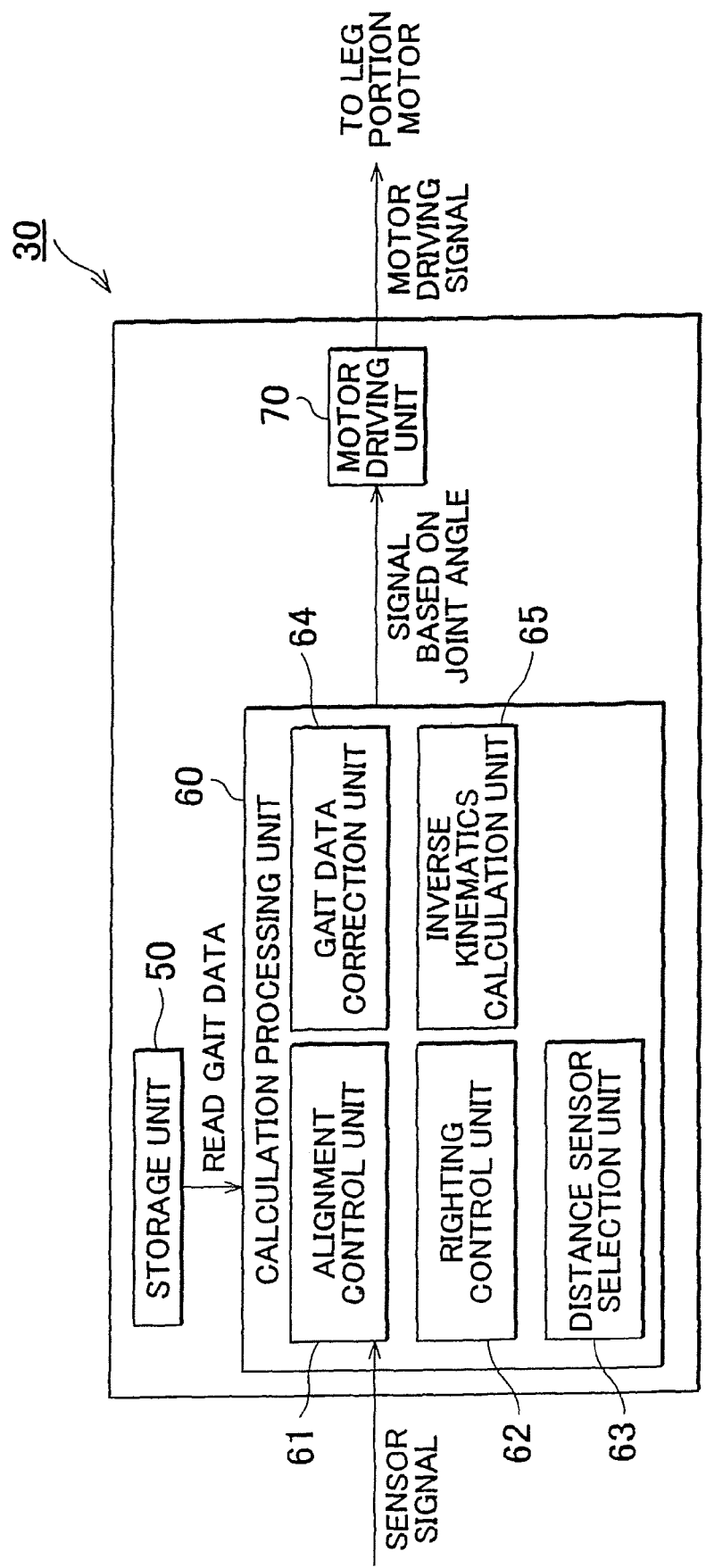
FIG. 3 is a function block diagram showing the constitution of the legged robot according to the first embodiment of the invention.

FIG. 3 is a function block diagram showing the functional constitution of the control unit 30. The control unit 30 includes a storage unit 50 storing the gait data, a calculation processing unit 60 for reading the gait data stored in the storage unit 50, and a motor driving unit 70 for driving the respective motors included in the leg portion 20.

The storage unit 50 stores the gait data (time series data relating to the target body position, target body attitude angle, target foot position, and target foot attitude angle). In the gait data, when the sole contacts the ground surface, the sole surface and ground surface enter a state of surface contact, and therefore the target foot attitude angle (a hypothetical tilt of the sole surface relative to a hypothetical ground surface) is set at zero. Further, the respective target values in the gait data are determined to satisfy a relationship according to which the ZMP position of the robot 100 is within a convex closure surrounded by the sole of the leg contacting the ground.

The calculation processing unit 60 reads the gait data stored in the storage unit 50, and calculates joint angles of the leg portion 20 required to realize an attitude of the robot 100 specified by the read gait data. The calculation processing unit 60 then transmits a signal based on the calculated joint angles to the motor driving unit 70. The calculation processing unit 60 also receives signals from the attitude angle sensor 14 and distance sensors 16 provided in the robot 100, and selects a distance sensor 16 to be used in the alignment control, as described below. Further, the calculation processing unit 60 adjusts driving amounts of the motors upon reception of the signals from the sensors.

More specifically, the calculation processing unit 60 includes an alignment control unit 61, a righting control unit 62, a distance sensor selection unit 63 serving as the distance sensor selecting means, a gait data correction unit 64 serving as the gait data correcting means, and an inverse kinematics calculation unit 65. The control unit 30 includes a feedback control system based on a deviation between the actual body attitude angle and target body attitude angle (a righting control system of the righting control unit 62) and a feedback control system based on a deviation between the relative actual foot attitude angle and target foot attitude angle seen from the ground surface (an alignment control system of the alignment control unit 61). It is assumed hereafter that the alignment control deviation relates to a relative foot attitude angle seen from the ground surface.

The righting control unit 62 functions to maintain an attitude of the body of the robot 100 at a target position/attitude. The body position/attitude corresponds to the actual body position and body attitude angle, while the target position/attitude corresponds to the target body position and body attitude angle. The actual body attitude angle is detected by the attitude angle sensor 14 provided in the body 10. The attitude angle sensor 14 includes a gyro that detects the angular velocity of the body 10, an integrator for integrating the output (angular velocity) of the gyro, and a triaxial acceleration sensor that detects a gravitational acceleration vector, for example. A falling direction detection unit (not shown) is capable of detecting a falling direction of the robot 100 based on a detection result from the attitude angle sensor 14.

When a state in which the sole is in close contact with the road surface is set as a target and the heel side is lifted from the ground surface, for example, the alignment control unit 61 matches the actual foot attitude angle to the target foot attitude angle by rotating the foot link 26 in a direction for causing the toe side of the foot link 26 to approach the tibia link 24. In other words, the alignment control unit 61 rotates the foot link 26 such that surface contact between the sole surface and ground surface is maintained. The actual foot attitude angle is determined from the output of the distance sensors 16a, 16b, 16c, 16d provided on the foot link 26. It is assumed that the distance sensors 16 used here are the distance sensors selected by the distance sensor selection unit 63 to be described below. A distance detection unit (not shown) detects the distance between the sole and the road surface based on a detection result among the distance sensors 16.

The distance sensor selection unit 63 selects the distance sensors 16 to be used to align the distance between the sole and the road surface based on the detection results of the attitude angle sensor 14 serving as the falling direction detection unit and the distance sensors 16 serving as the distance detection unit. A distance sensor selection method employed by the distance sensor selection unit 63 will be described in detail below.

The gait data correction unit 64 corrects the gait data based on output signals among the distance sensors selected by the distance sensor selection unit 63 such that the positional relationship between the sole and the road surface aligns with a target value. First, the gait data correction unit 64 calculates a foot deviation between the output value of the selected distance sensor 16 and an alignment target value. The gait data correction unit 64 then calculates a correction amount from the calculated foot deviation using a transfer function relating to the deviation.

More specifically, the gait data (time series data relating to the target body position, target body attitude angle, target foot position, and target foot attitude angle) stored in the storage unit 50 are corrected in the following manner and input into the inverse kinematics calculation unit 65.

The target foot position stored in the storage unit 50 is corrected based on the deviation between the target foot position and actual foot position, and then input into the inverse kinematics calculation unit 65.

The target body position stored in the storage unit 50 is corrected based on the deviation between a target body acceleration and an actual body acceleration, and then input into the inverse kinematics calculation unit 65. The target body acceleration is determined by differentiating the target body position twice. The actual body acceleration is detected by the acceleration sensor 12.

The target body attitude angle stored in the storage unit 50 is input into the inverse kinematics calculation unit 65 as is. Simultaneously, a deviation (body attitude angle deviation) between the target body attitude angle and the actual body attitude angle is determined. The body attitude angle deviation is input into the righting control unit 62, where a body correction angle by which the body is to be rotated in a direction for reducing the body attitude angle deviation is calculated. The actual body attitude angle is detected by the attitude angle sensor 14.

A deviation (foot attitude angle deviation) between the target foot attitude angle stored in the storage unit 50 and the actual foot attitude angle is then determined. The actual foot attitude angle is detected by the distance sensors 16 selected by the distance sensor selection unit 63. The foot attitude angle deviation is then added to the aforementioned body correction angle, whereupon the result of this addition is input into the alignment control unit 61. The alignment control unit 61 determines a foot correction angle by which the foot is to be rotated in a direction for reducing the input angle (the angle obtained by adding the body correction angle to the foot attitude angle deviation). The target foot attitude angle stored in the storage unit 50 is then added to the foot correction angle (corrected by the foot correction angle), whereupon the result is input into the inverse kinematics calculation unit 65.

The gait data corrected in the manner described above are input into the inverse kinematics calculation unit 65. From the gait data, the inverse kinematics calculation unit 65 calculates a target joint angle of each joint of the leg portion 20 by means of an inverse kinematics calculation. Here, the respective target values are represented by values relating to an absolute coordinate system. The inverse kinematics calculation unit 65 calculates relative positions of the foot and body from the difference between the target foot position and target body position, and calculates relative rotation angles of the foot and body from the difference between the target foot attitude angle (corrected by the foot correction angle) and the target body attitude angle. Target joint angles for realizing the calculated relative positions and relative rotation angles are then calculated.

The motor driving unit 70 specifies driving amounts of the respective motors for driving the leg portion 20 based on a target joint angle signal transmitted by the calculation processing unit 60, and transmits a motor driving signal for driving the motors by the driving amounts to each motor. As a result, the driving amount of each joint of the leg portion 20 is modified, and thus the movement of the robot 100 is controlled.

Figure 4:
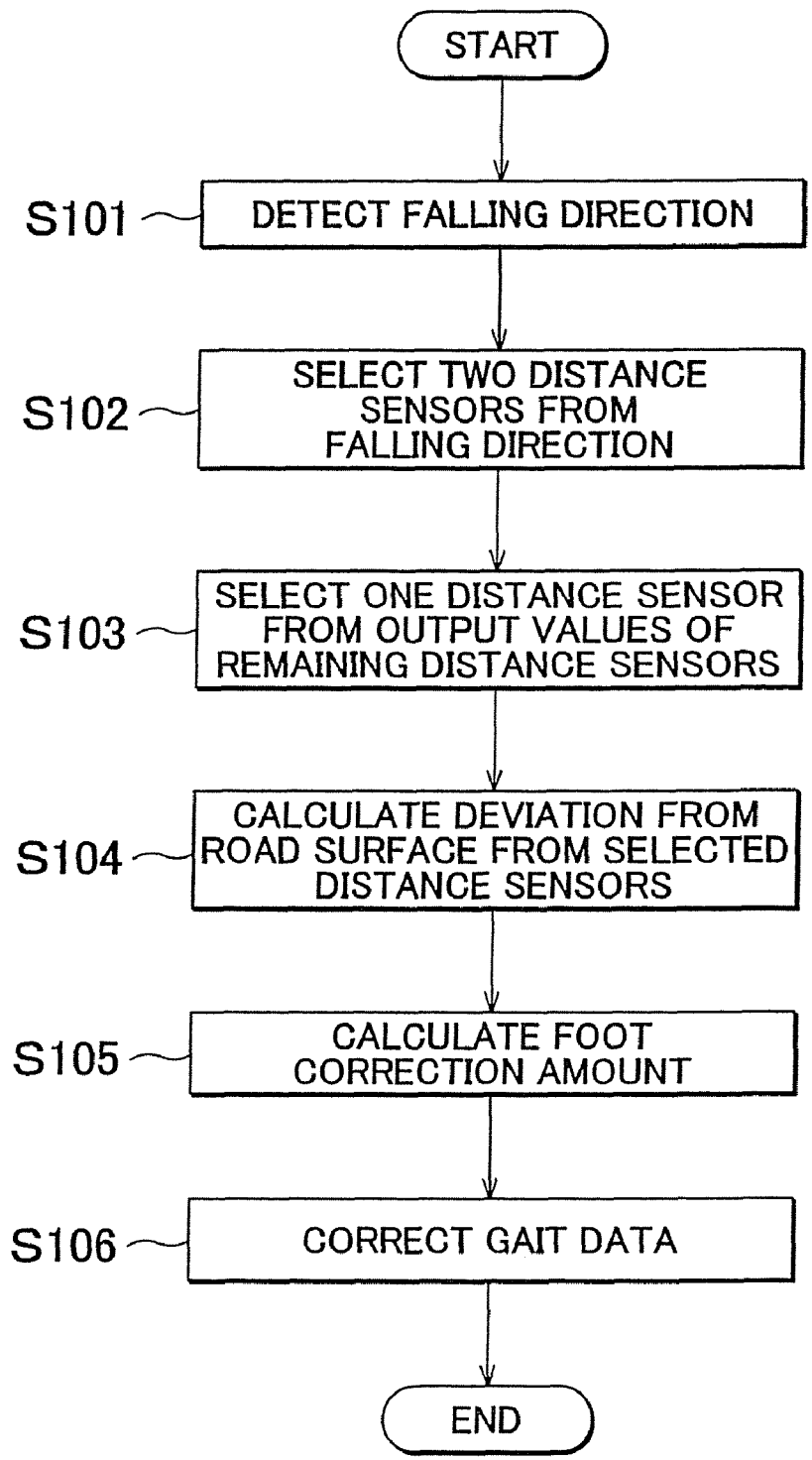
FIG. 4 is a flowchart showing processing performed by a control unit of the legged robot according to the first embodiment of the invention.
Figure 5:
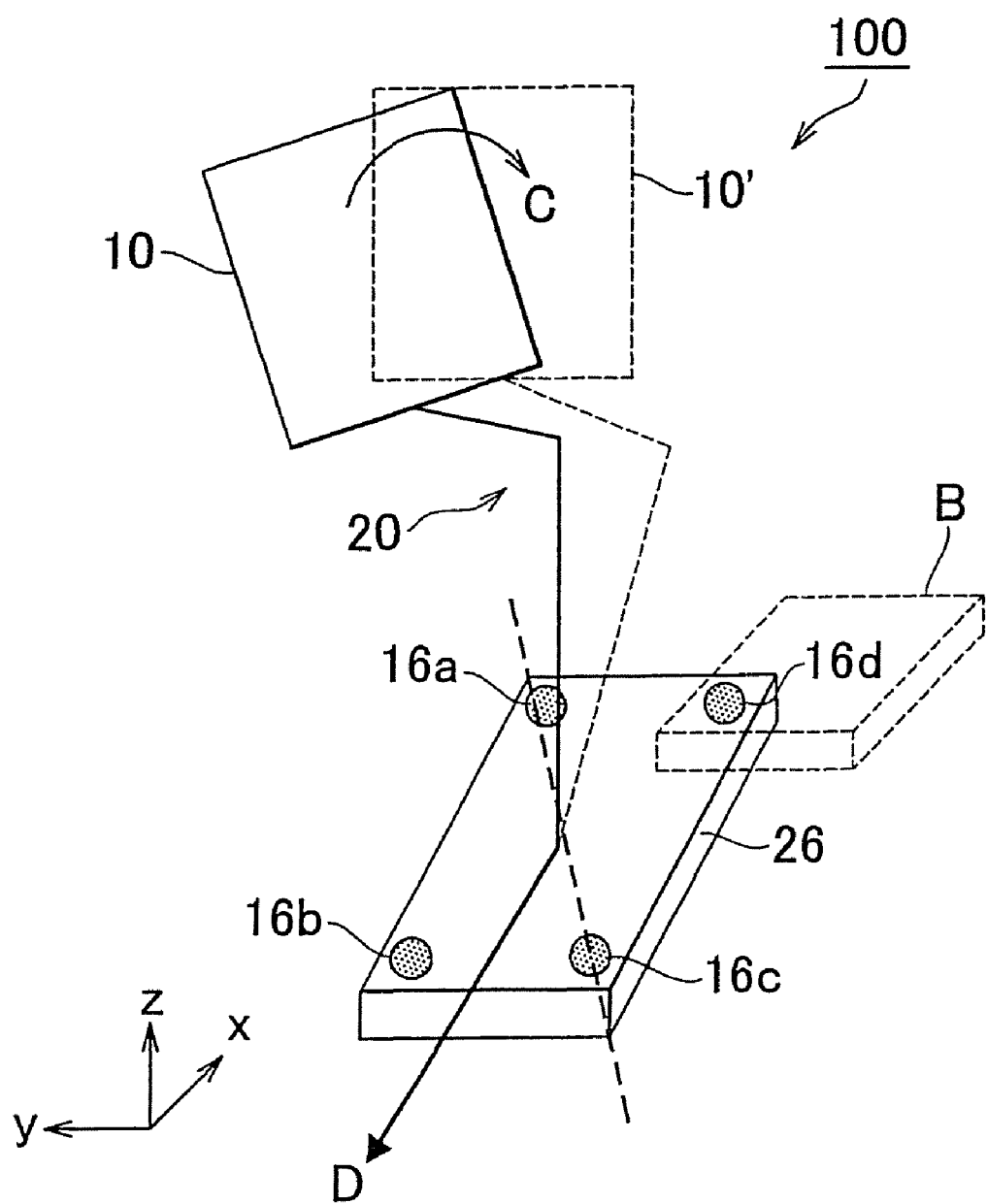
FIG. 5 is a view illustrating a state in which a part of the foot link of the legged robot according to the first embodiment of the invention is in contact with an obstacle.

Next, referring to FIG. 4, control processing performed by the robot 100 according to the first embodiment will be described. FIG. 4 is a flowchart illustrating an outline of the control processing. It is assumed that during the control processing shown in FIG. 4, a part of the foot link 26 of the robot 100 is in contact with an obstacle B on uneven ground. FIG. 5 is a view illustrating a state in which a part of the foot link 26 of the robot 100 is in contact with the obstacle B. FIG. 5 is a schematic side view showing the legged robot 100 having the body 10 and the leg portion 20. Note that FIG. 5 shows only the body 10 and the leg portion 20 of the robot 100, and the other leg portion has been omitted. The foot link 26 is provided with the four distance sensors 16a, 16b, 16c, 16d. In FIG. 5, an absolute coordinate system constituted by the x axis, y axis and z axis shown in the drawing is used for descriptive purposes.

In FIG. 5, an overall position/attitude to be realized in the robot 100 is indicated by broken lines. The position/attitude of the robot 100 is controlled in the direction of an arrow C to set the robot 100 in the target position/attitude indicated by the broken lines. First, the falling direction detection unit detects the falling direction of the robot 100 based on the detection result of the attitude angle sensor 14 (step S101). The falling direction detection unit is capable of detecting the falling direction from the attitude deviation of the body 10, the angular velocity of the body 10, and so on. For example, by calculating the body attitude deviation (i.e., the actual attitude seen from the target attitude), a floor reaction force moment in a direction for reducing the body attitude deviation is generated, and therefore the direction in which the foot link 26 is to be aligned can be determined.

For example, it is assumed that the actual attitude of the robot 100 is tilted relative to the target attitude, as shown in FIG. 6A. Here, an attitude deviation vector (roll, pitch) of the actual attitude relative to the target attitude seen from the supporting leg is set at ($^{leg}\Delta_{roll}$, $^{leg}\Delta_{pitch}$). Then, by solving the following equation using the attitude deviation vector ($^{leg}\Delta_{roll}$, $^{leg}\Delta_{pitch}$), an attitude deviation angle $\theta_A$ is determined, as shown in FIG. 6B. When the attitude deviation angle $\theta_A$ is used, the falling direction can be expressed as $\theta_A - \pi/2$. In the example shown in FIG. 6, it can be detected from the attitude deviation that the body 10 is tilted leftward and rearward (arrow D). Thus, the falling direction of the robot 100 can be detected from the body attitude deviation.

$$\theta_\Delta = \tan^{-1}\left(\frac{^{leg}\Delta_{pitch}}{^{leg}\Delta_{roll}}\right) \quad \text{[Equation 1]}$$

Next, the robot 100 selects two sensors based on the falling direction detected in the step S101 (step S102). As shown in FIG. 5, a case in which the obstacle B (projecting portion) exists in the position of the distance sensor 16d is envisaged. In this case, assuming that the distance sensors 16a, 16b, 16c are selected based on the falling direction, output values among the distance sensors 16a and 16c cannot be set at 0 simultaneously due to the obstruction caused by the projecting portion B, and therefore the sole cannot be aligned with the road surface. In such a case, the two sensors 16b, 16c are initially selected based on the falling direction so that at least a floor reaction force moment enabling correction of the tilt of the body 10 can be generated.

Here, using FIG. 7, a method of selecting two distance sensors based on the falling direction will be described in detail. First, constants $\Theta_1$ to $\Theta_4$ for selecting the distance sensors 16 are calculated in advance based on the following equations from the positional relationships between the sole and the distance sensors 16. Here, $X_t$ is a distance between the distance sensors 16d and 16c (a distance between the distance sensors 16a and 16b) provided on the foot link 26, and $Y_t$ is a distance between the distance sensors 16b and 16c (a distance between the distance sensors 16a and 16d). Note that the constants $\Theta_1$ to $\Theta_4$ are determined within a range of $-\pi$ to $\pi$ using an atan 2 function.

$$\Theta_1 = \tan^{-1}\left(\frac{Y_t/2}{X_t/2}\right) = \tan^{-1}\left(\frac{Y_t}{X_t}\right) \quad \text{[Equation 2]}$$

$$\Theta_2 = \tan^{-1}\left(\frac{Y_t/2}{-X_t/2}\right) = \tan^{-1}\left(\frac{Y_t}{-X_t}\right)$$

$$\Theta_3 = \tan^{-1}\left(\frac{-Y_t/2}{-X_t/2}\right) = \tan^{-1}\left(\frac{-Y_t}{-X_t}\right)$$

$$\Theta_4 = \tan^{-1}\left(\frac{-Y_t/2}{X_t/2}\right) = \tan^{-1}\left(\frac{-Y_t}{X_t}\right)$$

The two distance sensors are then selected in the following manner using the constants $\Theta_1$ to $\Theta_4$ calculated in Numeral 2 and the attitude deviation angle $\theta_A$ calculated in Numeral 1. When $\Theta_4 \leq \theta_A - \pi/2 \leq \Theta_1$ (i.e. $\Theta_4 + \pi/2 \leq \theta_A \leq \Theta_1 + \pi/2$) is established, the distance sensors 16a and 16d are selected as the two distance sensors and activated. Here, the unselected distance sensors are 16b and 16c, and one more distance sensor is selected from these remaining distance sensors, as will be described below. When $\Theta_3 \leq \theta_A - \pi/2 \leq \Theta_4$ (i.e. $\Theta_3 + \pi/2 \leq \theta_A \leq \Theta_4 + \pi/2$) is established, the distance sensors 16c and 16d are selected as the two distance sensors and activated. Here, the unselected distance sensors are 16a and 16b, and one more distance sensor is selected from these remaining distance sensors, as will be described below. When $\Theta_2 \leq \theta_A - \pi/2 \leq \Theta_3$ (i.e. $\Theta_2 + \pi/2 \leq \theta_A \leq \Theta_3 + \pi/2$) is established, the distance sensors 16b and 16c are selected as the two distance sensors and activated. Here, the unselected distance sensors are 16a and 16d, and one more distance sensor is selected from these remaining distance sensors, as will be described below. When $\Theta_1 \leq \theta_A - \pi/2 \leq \pi/2$ or $-3\pi/2 \leq \theta_A - \pi/2 \leq \Theta_2$ (i.e. $\Theta_1 + \pi/2 \leq \theta_A \leq \pi$ or $-\pi \leq \theta_A \leq \Theta_2 + \pi/2$) is established, the distance sensors 16a and 16b are selected as the two distance sensors and activated. Here, the unselected distance sensors are 16c and 16d, and one more distance sensor is selected from these remaining distance sensors.

Figure 7:
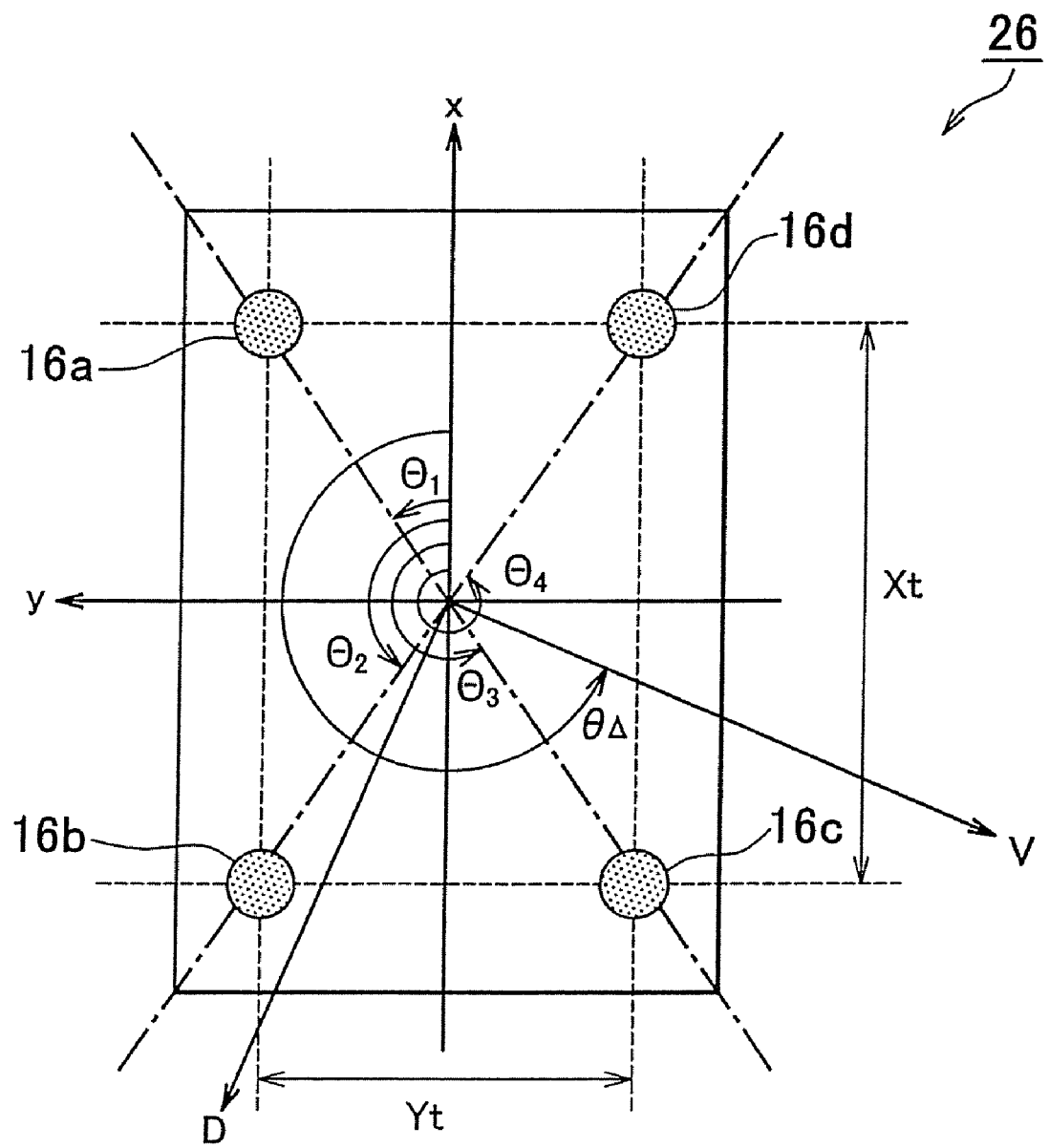
FIG. 7 is a view illustrating processing for selecting a distance sensor based on the falling direction, according to the first embodiment of the invention.

In FIG. 7, a falling direction D is detected from an attitude deviation vector V, for example, using the attitude deviation angle $\theta_A$. In the drawing, the attitude deviation angle $\theta_A$ satisfies $\Theta_2 \leq \theta_A - \pi/2 \leq \Theta_3$ (i.e. $\Theta_2 + \pi/2 \leq \theta_A \leq \Theta_3 + \pi/2$), and therefore the distance sensors 16b and 16c are selected as the two distance sensors and activated. By selecting the distance sensors in this manner, two distance sensors 16 enabling effective acquisition of a floor reaction force moment for correcting the tilt of the body 10 can be selected based on the falling direction D. Note that upon actual implementation, a hysteresis characteristic may be included. In so doing, chattering, which occurs when the attitude deviation vector approaches zero, can be prevented.

Next, the robot 100 selects the distance sensor 16 in which the distance between the sole and the road surface is smallest from the two remaining distance sensors 16 not selected in the step S102 (step S103). In the step S102, two distance sensors are selected from the four distance sensors 16. In the step S103, one distance sensor is selected from the two remaining distance sensors 16 not selected in the step S102 based on a measurement height, i.e. the output value of the distance sensor 16. The distance sensor 16 having the smallest measurement height is assumed to be the distance sensor positioned on the projecting portion side. Therefore, by selecting and activating the distance sensor 16 having the smallest measurement height, the foot link 26 can be stabilized and controlled to align with the road surface, regardless of irregularities on the road surface. Note that upon actual implementation, a hysteresis characteristic may be included, similarly to the selection of the distance sensors 16 in the step S102.

Next, the robot 100 calculates the foot deviation (roll, pitch, z), i.e. the deviation between the sole and the road surface, from the three distance sensors 16 selected in the steps S102 and S103 (step S104). Here, the foot deviation (roll, pitch, z) between the actual position/attitude of the foot link 26 and the target position/attitude is set as ($\Delta\phi$, $\Delta\theta$, $\Delta z$). Note that z indicates the vertical direction measurement height. For example, when the three distance sensors 16a, 16b, 16c are selected, the foot deviation can be calculated using the following conversion equation. According to the conversion matrix shown in the following equation, the foot deviation can be determined uniquely from deviations ($\Delta z_1$, $\Delta z_2$, $\Delta z_3$, $\Delta z_4$) in the output values of the respective distance sensors 16a to 16d and a three-row, four-column conversion matrix corresponding to the deviations of the respective distance sensors 16 using approximation from the geometrical relationship between the sole and the disposal positions of the distance sensors 16. Note that the value of each element in the conversion matrix differs according to the selected distance sensor 16.

$$\begin{pmatrix} \Delta\phi \\ \Delta\theta \\ \Delta z \end{pmatrix} = \begin{pmatrix} X_{11} & X_{12} & X_{13} & 0 \\ X_{21} & X_{22} & X_{23} & 0 \\ X_{31} & X_{32} & X_{33} & 0 \end{pmatrix} \begin{pmatrix} \Delta z_1 \\ \Delta z_2 \\ \Delta z_3 \\ \Delta z_4 \end{pmatrix}$$ [Equation 3]

Next, the robot 100 calculates a foot correction amount for actually correcting the gait data using the foot deviation calculated in the step S104 (step S105). The foot correction amount can be calculated through a transfer function having the foot deviation as input and the foot correction amount as output. FIG. 8 is a view illustrating transfer functions having the foot deviation as input and the foot correction amount as output. As shown in the drawing, with respect to the foot correction amount (roll), the roll deviation $\Delta\phi$ is passed through a transfer function $C_\phi$ (s). With respect to the foot correction amount (pitch), the pitch deviation $\Delta\theta$ is passed through a transfer function $C_\theta$ (s). With respect to the foot correction amount (z), the z deviation $\Delta z$ is passed through a transfer function $C_z$ (s). Note that in a case where the employed distance sensors are switched such that the foot deviation becomes discontinuous, these transfer functions may have a characteristic whereby a high-frequency gain is reduced.

Next, the robot 100 corrects the gait data to realize the foot correction amount calculated in the step S105 (step S106). When the operation is to be continued, the robot 100 returns to the step S101 and continues the processing, and when the operation is to be terminated, the robot 100 terminates the processing.

As described above, by detecting the falling direction of the robot 100 and selecting three sole distance sensors 16 for attaining the target value based on the detection result, contact between the sole and the road surface can be maintained while effectively obtaining a floor reaction force moment for righting the trunk (body 10) of the robot 100. Hence, by obtaining the floor reaction force moment from the sole while keeping the supporting leg in close contact with the floor surface, stabilization control for righting the trunk of the robot 100 can be executed easily, and as a result, the robot 100 can walk over uneven ground without falling over.

Figure 9:
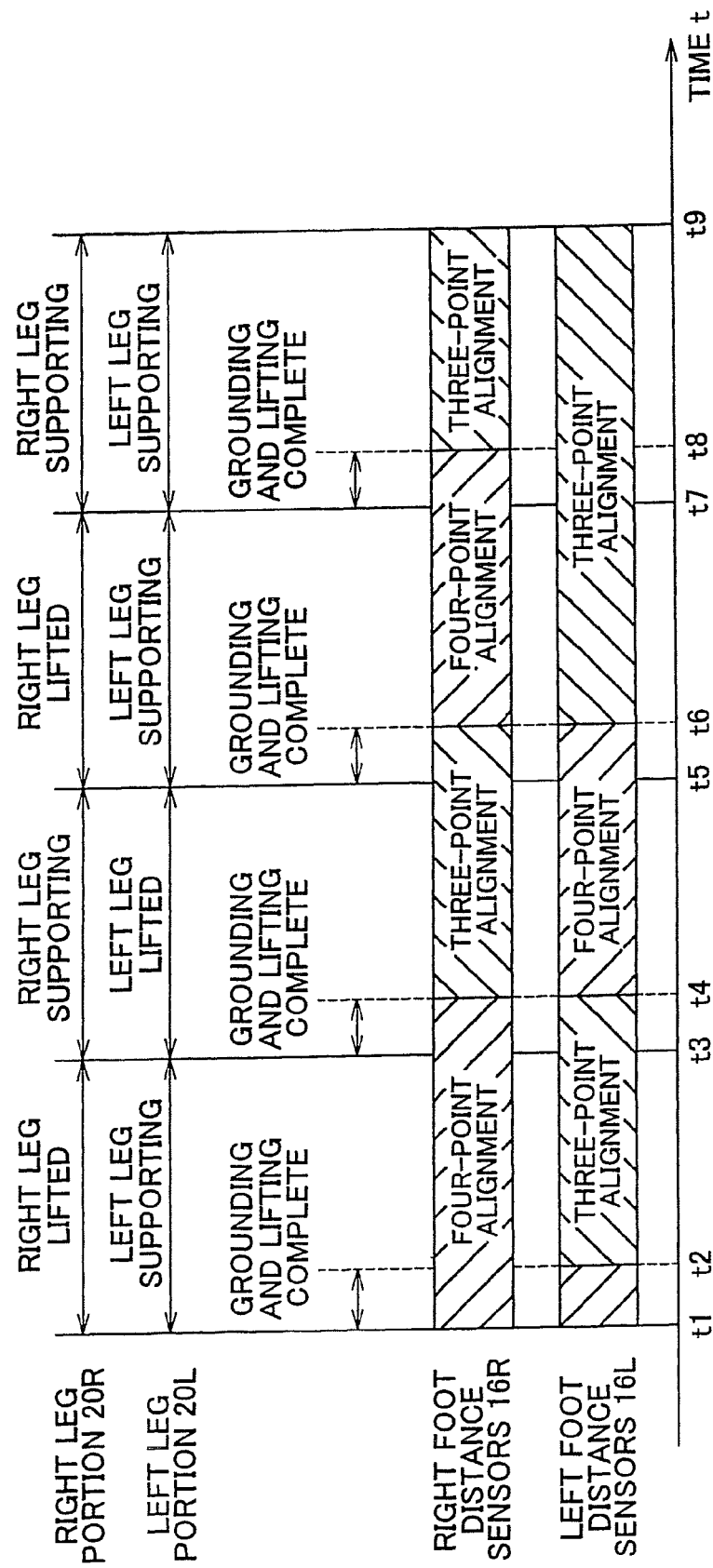
FIG. 9 is a view illustrating the manner in which the control unit of the legged robot according to the first embodiment of the invention modifies a number of activated distance sensors in accordance with a walking operation pattern.
Figure 10:
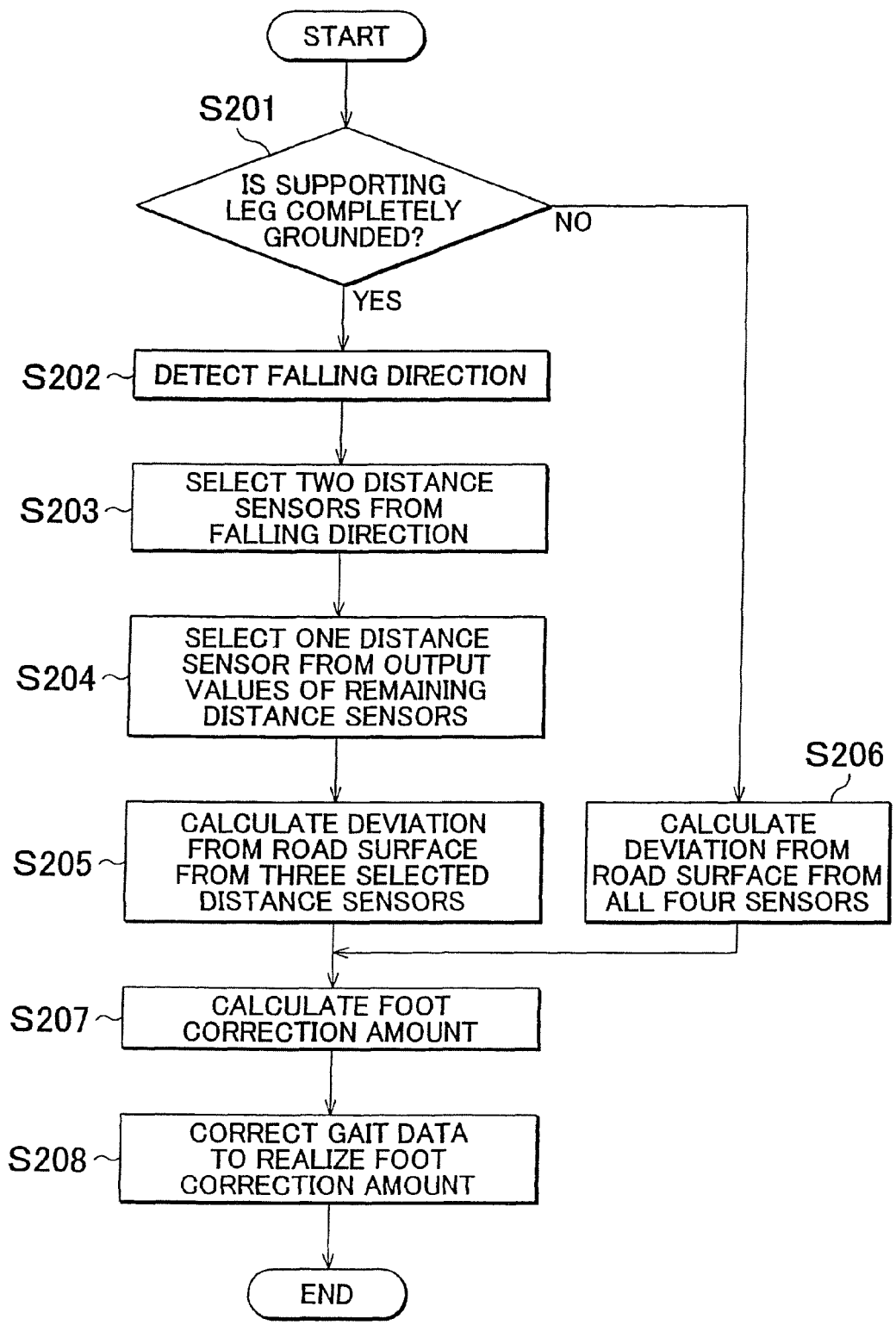
FIG. 10 is a flowchart illustrating an outline of control processing performed when a leg portion of the legged robot according to the first embodiment of the invention is in a supporting leg condition.
Figure 11:
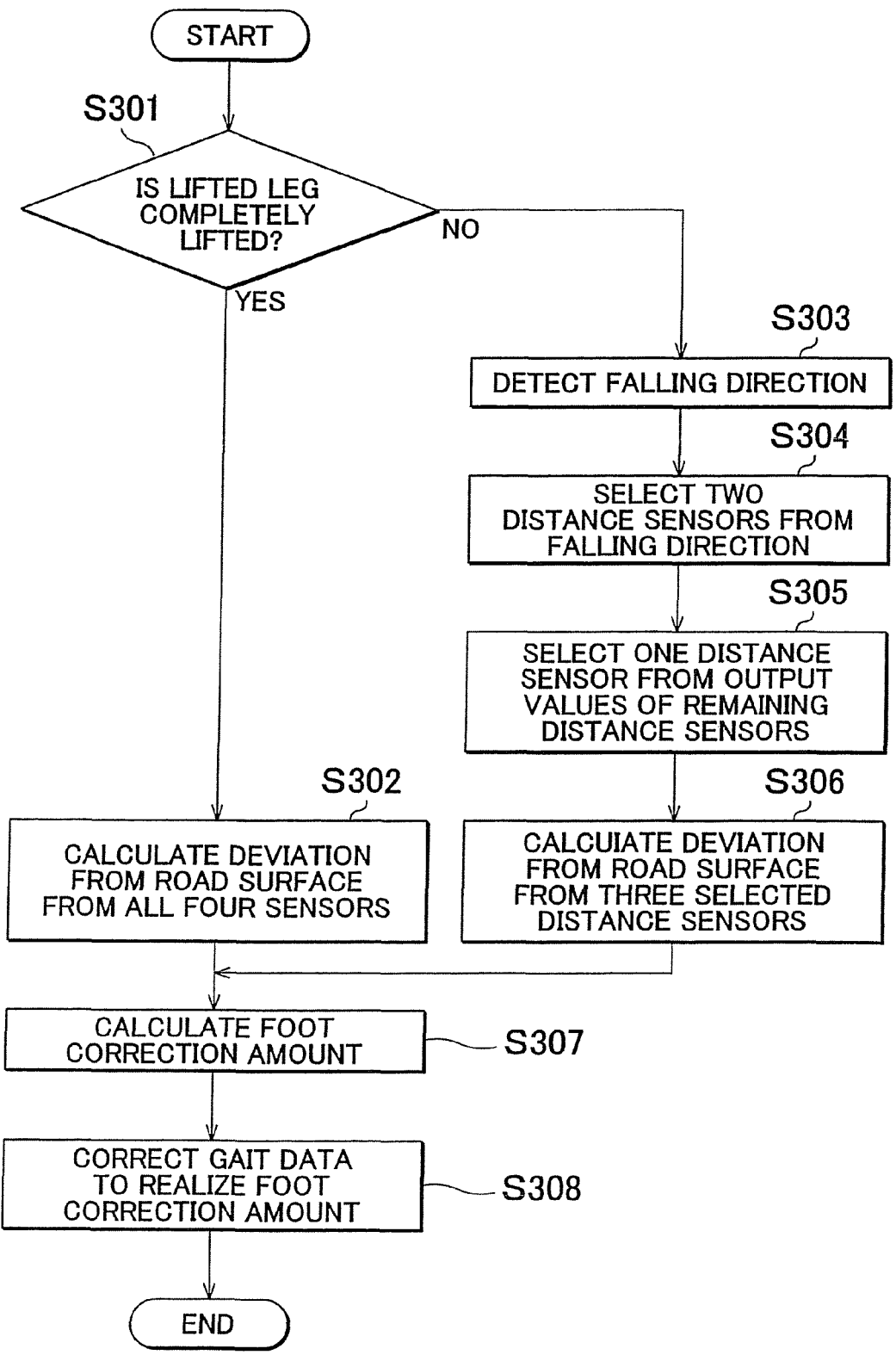
FIG. 11 is a flowchart illustrating an outline of control processing performed when the leg portion of the legged robot according to the first embodiment of the invention is in a lifted leg condition.

Next, referring to FIGS. 9 to 11, control processing performed during a walking operation of the robot 100 according to the first embodiment will be described. FIG. 9 is a view illustrating the manner in which the robot 100 modifies the number of activated distance sensors in accordance with a walking operation pattern during the walking operation. FIG. 10 is a flowchart illustrating an outline of control processing performed when the leg portion 20 of the robot 100 is in a supporting leg condition. FIG. 11 is a flowchart illustrating an outline of control processing performed when the leg portion 20 of the robot 100 is in a lifted leg condition.

As shown in FIG. 9, the robot 100 modifies the number of activated distance sensors, from among the distance sensors disposed on the foot link 26, in accordance with the walking operation pattern. The robot 100 is capable of differentiating between a walking operation pattern in which the leg portion 20 serves as the supporting leg and a walking operation pattern in which the leg portion 20 serves as the lifted leg. The robot 100 may also be constituted to detect whether the supporting leg is completely grounded and whether the lifted leg is completely lifted either based on the gait data or from the output values of the distance sensors 16, for example.

As a rule, when the leg portion 20 is in the supporting leg condition, three of the distance sensors disposed on the foot link 26 are activated (in FIG. 9, a section extending from $t_2$ to $t_3$ with respect to left foot distance sensors 16L when a left leg portion 20L is in the supporting leg condition, for example).

As another rule, when the leg portion 20 is in the lifted leg condition, all of the distance sensors (four distance sensors in the drawings) are activated (in FIG. 9, the section extending from $t_2$ to $t_3$ with respect to right foot distance sensors 16R when a right leg portion 20R is in the lifted leg condition, for example). While the leg portion 20 shifts from the supporting leg condition to the lifted leg condition, the minimum required number of distance sensors is activated, and after the sole has completely left the ground and entered the lifted leg condition, all of the distance sensors are activated (in FIG. 9, a section extending from $t_3$ to $t_4$ with respect to the left foot distance sensors 16L when the left leg portion 20L is in the supporting leg condition, for example). While the leg portion 20 shifts from the lifted leg condition to the supporting leg condition, all of the distance sensors are activated, and once the sole is completely grounded so as to enter the supporting leg condition, the minimum required number of distance sensors (three distance sensors in the drawings) is activated (in FIG. 9, the section extending from $t_3$ to $t_4$ with respect to the right foot distance sensors 16R when the right leg portion 20R is in the lifted leg condition, for example). Here, time points $t_2$ and $t_6$ represent a point in time at which the right leg portion 20R serving previously as the supporting leg has completely left the ground and the left leg portion 20L serving previously as the lifted leg is completely grounded. Time points $t_4$ and $t_8$ represent a point in time at which the right leg portion 20R serving previously as the lifted leg is completely grounded and the left leg portion 20L serving previously as the supporting leg has completely left the ground.

Control processing performed when the leg portion 20 of the robot 100 is in the supporting leg condition will now be described using the flowchart shown in FIG. 10. First, a determination is made as to whether the leg portion 20 is completely grounded following a process for shifting one of the leg portions 20 from the lifted leg condition to the supporting leg condition, which is performed during a walking operation of the robot 100 (step S201). When the determination result indicates that the leg portion 20 is completely grounded (i.e. the leg portion 20 is in the supporting leg condition), three distance sensors 16 are selected, as described above. In other words, the falling direction of the robot 100 is detected (step S202). Next, two distance sensors 16 are selected based on the falling direction (step S203). Next, one of the remaining distance sensors 16 is selected based on the distance between the sole and the road surface (step S204). Next, the foot deviation from the road surface is calculated from the three selected distance sensors 16 (step S205).

If the determination result of the step S201 indicates that the leg portion 20 is not completely grounded (i.e. the leg portion 20 is not yet in the supporting leg condition), on the other hand, all of the distance sensors 16 are activated, and the foot deviation from the road surface is calculated from all of the distance sensors 16 (step S206). When all of the four distance sensors 16a, 16b, 16c, 16d are activated, for example, the foot deviation can be calculated using the following conversion equation.

$$\begin{pmatrix} \Delta\phi \\ \Delta\theta \\ \Delta z \end{pmatrix} = \begin{pmatrix} X_{11} & X_{12} & X_{13} & X_{14} \\ X_{21} & X_{22} & X_{23} & X_{24} \\ X_{31} & X_{32} & X_{33} & X_{34} \end{pmatrix} \begin{pmatrix} \Delta z_1 \\ \Delta z_2 \\ \Delta z_3 \\ \Delta z_4 \end{pmatrix}$$ [Equation 4]

Next, the foot correction amount for actually correcting the gait data is calculated using the foot deviation calculated in the step S205 or S206 (step S207). The robot 100 then corrects the gait data to realize the foot correction amount calculated in the step S207 (step S208). When the operation is to be continued, the robot 100 then returns to the step S201 and continues the processing, and when the operation is to be terminated, the robot 100 terminates the processing.

By activating all sensors until the foot link 26 is completely grounded on the road surface, the foot link 26 can be aligned with the road surface quickly. As a result, outside disturbances during grounding can be suppressed effectively.

Next, control processing performed when the leg portion 20 of the robot 100 is in the lifted leg condition will be described using the flowchart shown in FIG. 11. First, a determination is made as to whether the leg portion 20 has completely left the ground following a process for shifting one of the leg portions 20 from the supporting leg condition to the lifted leg condition, which is performed during a walking operation of the robot 100 (step S301). When the determination result indicates that the leg portion 20 has completely left the ground (i.e. the leg portion 20 is in the lifted leg condition), all of the distance sensors 16 are activated and the foot deviation from the road surface is calculated from all of the distance sensors 16, as described above (step S302).

If the determination result of the step S301 indicates that the leg portion 20 has not completely left the ground (i.e. the leg portion 20 is not yet in the lifted leg condition), on the other hand, three distance sensors 16 are selected, as described above. In other words, the falling direction of the robot 100 is detected (step S303). Next, two distance sensors 16 are selected based on the falling direction (step S304). Next, one of the remaining distance sensors 16 is selected based on the distance between the sole and the road surface (step S305). Next, the foot deviation from the road surface is calculated from the three selected distance sensors 16 (step S306).

Next, the foot correction amount for actually correcting the gait data is calculated using the foot deviation calculated in the step S302 or S306 (step S307). The robot 100 then corrects the gait data to realize the foot correction amount calculated in the step S307 (step S308). When the operation is to be continued, the robot 100 then returns to the step S301 and continues the processing, and when the operation is to be terminated, the robot 100 terminates the processing.

Until the lifted leg has completely left the ground, the sole and the road surface remain in contact, and therefore, by selecting and activating three of the distance sensors 16 in this manner, the correction amount of the supporting leg is held. Further, by selecting and activating all of the distance sensors once the lifted leg has completely left the ground, the lifted leg can be aligned in a direction avoiding the road surface quickly even after contacting the road surface.

In the first embodiment described above, when four distance sensors 16 are provided on the foot link 26, processing is performed to select three of these distance sensors 16 based on the falling direction. However, the invention is not limited to this embodiment, and three distance sensors may be selected from at least three distance sensors provided on the foot link 26 based on the falling direction. Note that the constitution of the robot 100 according to a second embodiment is identical to that of the first embodiment of the invention, excluding the constitution of the foot link 26 and the arrangement of the distance sensors 16 provided on the foot link 26.

Figure 12:
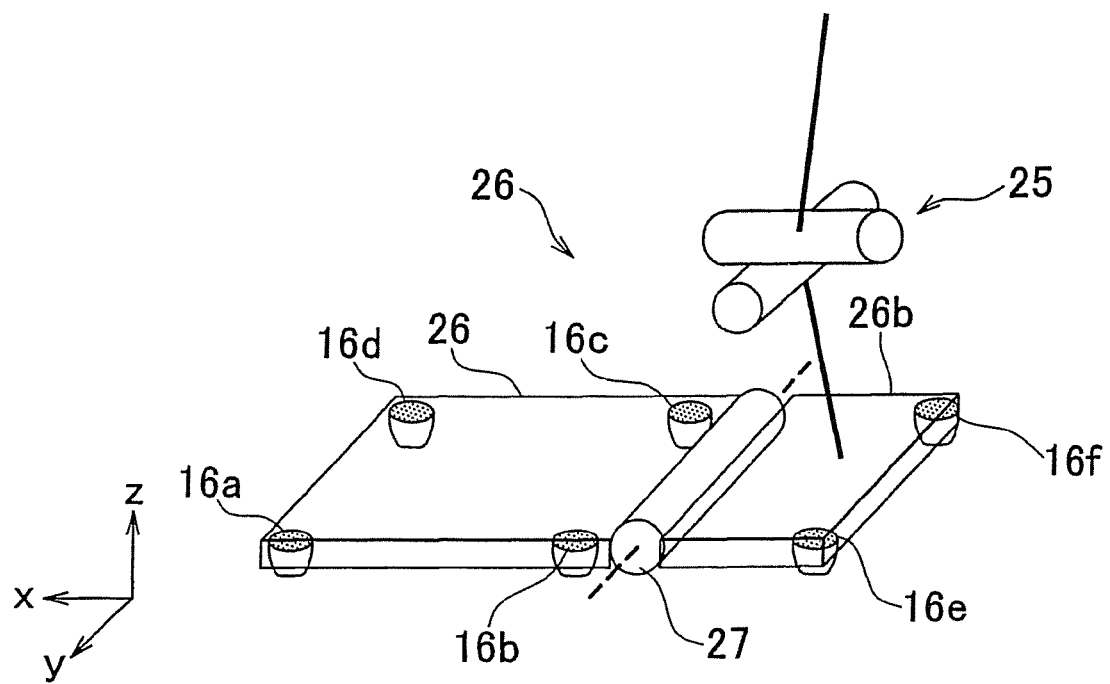
FIG. 12 is a constitutional diagram of a foot link of a legged robot according to a second embodiment of the invention.

FIG. 12 is a view illustrating the constitution of the foot link 26 on the robot 100 according to the second embodiment. The foot link 26 includes a toe portion 26a and a heel portion 26b connected to the toe portion 26a via a toe joint 27. By driving the toe joint 27 during a walking operation of the robot 100, the heel portion 26b can be raised while keeping the toe portion 26a in contact with the road surface. In other words, the robot 100 can be caused to stand upright by grounding only the toe portion 26a while the heel portion 26b is raised.

As shown in FIG. 12, the toe portion 26a and heel portion 26b take a substantially rectangular shape when seen from the upper surface. The four distance sensors 16a, 16b, 16c, 16d are provided respectively near the four corners of the toe portion 26a. Here, the two distance sensors 16a and 16d are provided on the toe side of the toe portion 26a, while the two distance sensors 16b and 16c are provided on the heel portion direction side. The distance sensors 16a and 16d detect the distance between the sole surface and the ground surface S in predetermined positions at the front of the toe portion 26a, while the distance sensors 16b and 16c detect the distance between the sole surface and the ground surface S in predetermined positions at the rear of the toe portion 26a. Two distance sensors 16e and 16f are provided on the heel portion 26b in the two corners of the opposite side to the toe portion side. The distance sensors 16e and 16f detect the distance between the sole surface and the ground surface S in predetermined positions at the rear of the heel portion 26b. Thus, the tilt of the sole surface of the foot link 26 relative to the ground surface S can be determined from the differences between the distances detected by the distance sensors 16a and 16d, the distances detected by the distance sensors 16b and 16c, and the distances detected by the distance sensors 16e and 16f.

When the toe joint 27 is driven to align the toe portion 26a and heel portion 26b with the road surface, the robot 100 according to the second embodiment selects three distance sensors 16 among the distance sensors 16 disposed on the toe portion 26a based on the falling direction of the robot 100, and selects one distance sensor 16 among the distance sensors 16 disposed on the heel portion 26b to align with the distance to the road surface based on the distance between the heel portion 26b and the road surface.

Figure 13:
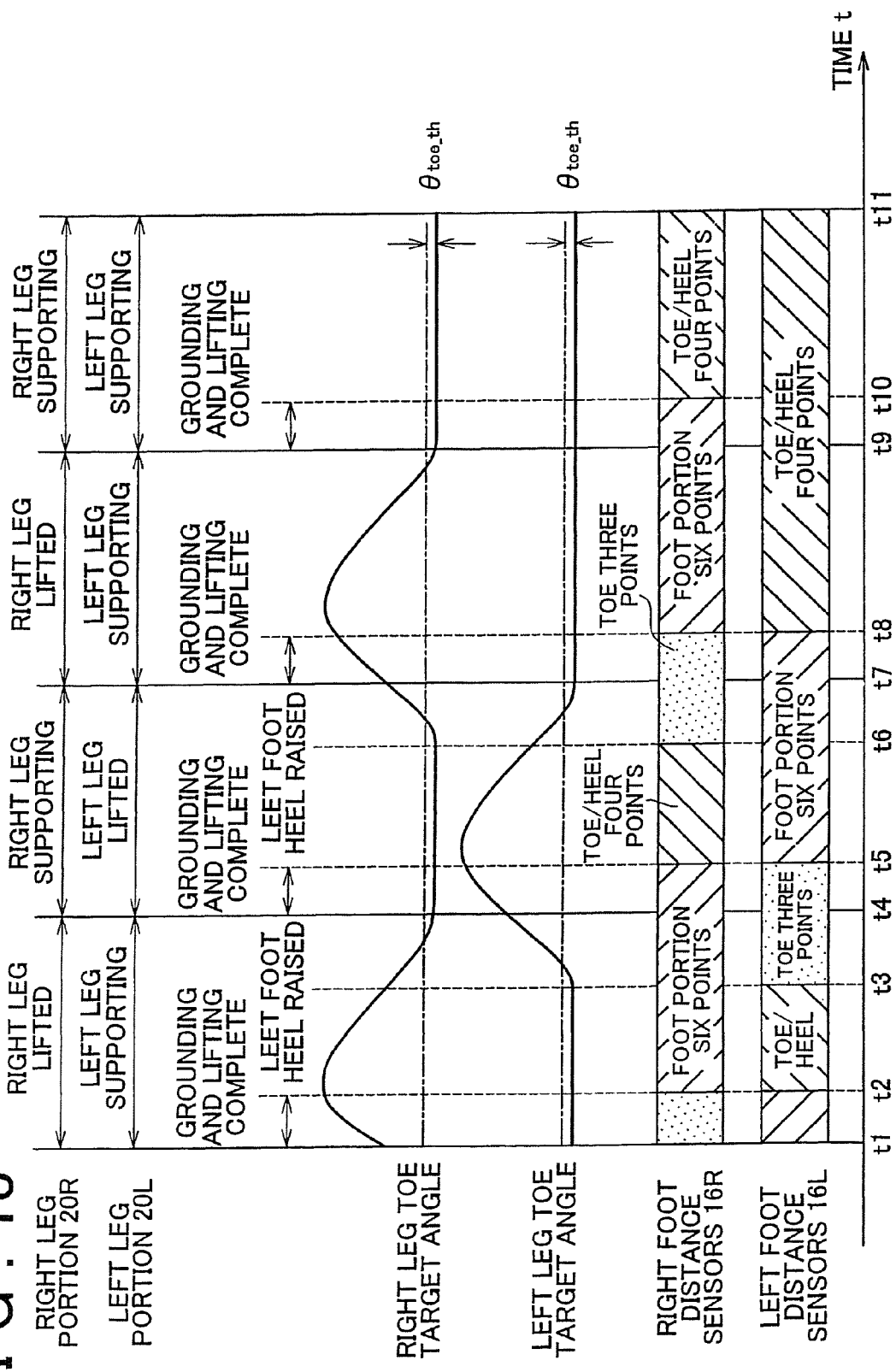
FIG. 13 is a view illustrating the manner in which a control unit of the legged robot according to the second embodiment of the invention modifies a number of activated distance sensors in accordance with a walking operation pattern.
Figure 14:
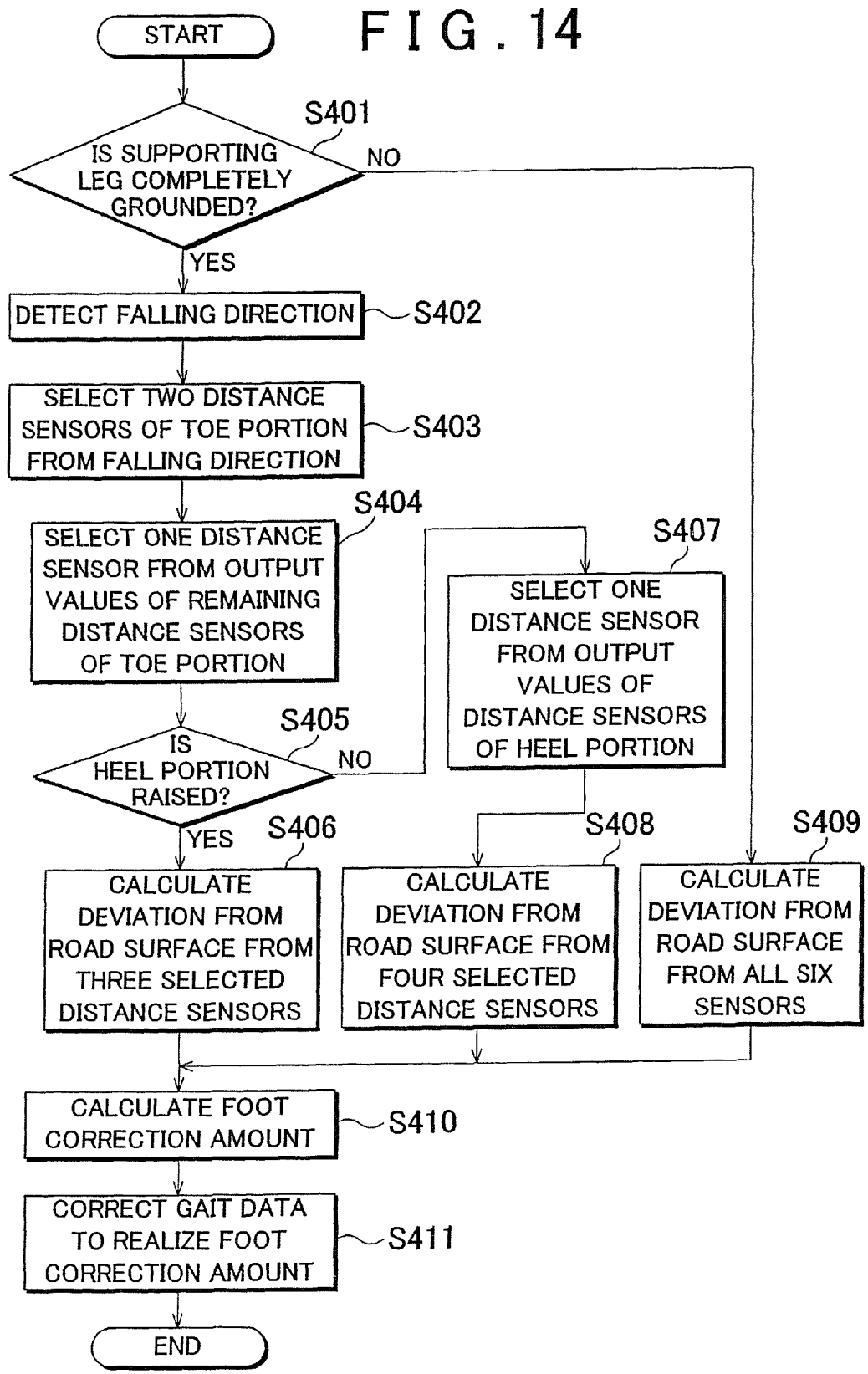
FIG. 14 is a flowchart illustrating an outline of control processing performed when a leg portion of the legged robot according to the second embodiment of the invention is in a supporting leg condition.
Figure 15:
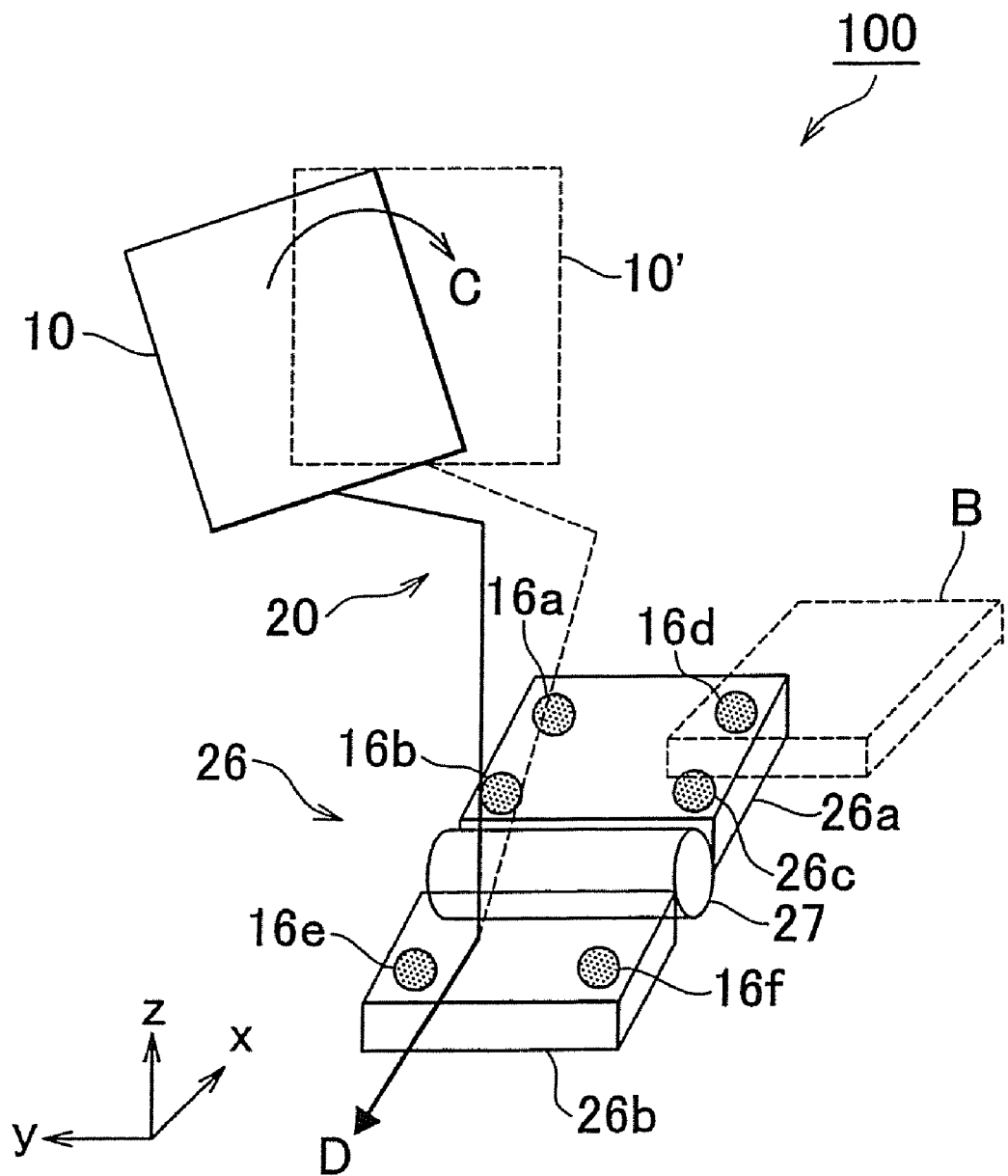
FIG. 15 is a view illustrating a state in which a part of a foot link of the legged robot according to the second embodiment of the invention is in contact with an obstacle.
Figure 16:
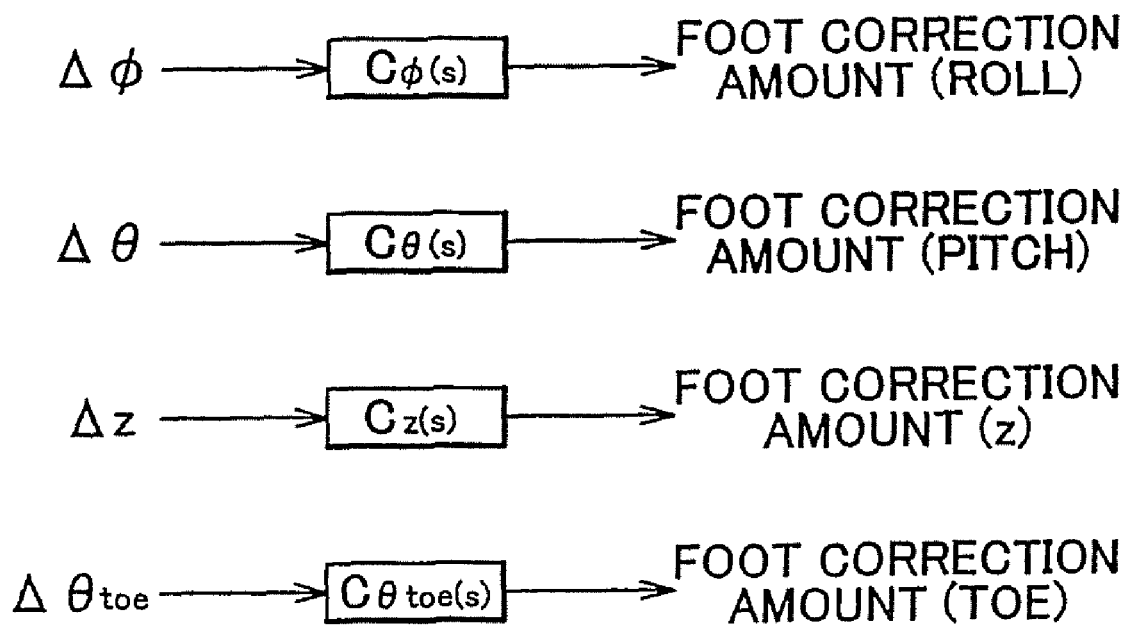
FIG. 16 is a view illustrating transfer functions according to the second embodiment of the invention.
Figure 17:
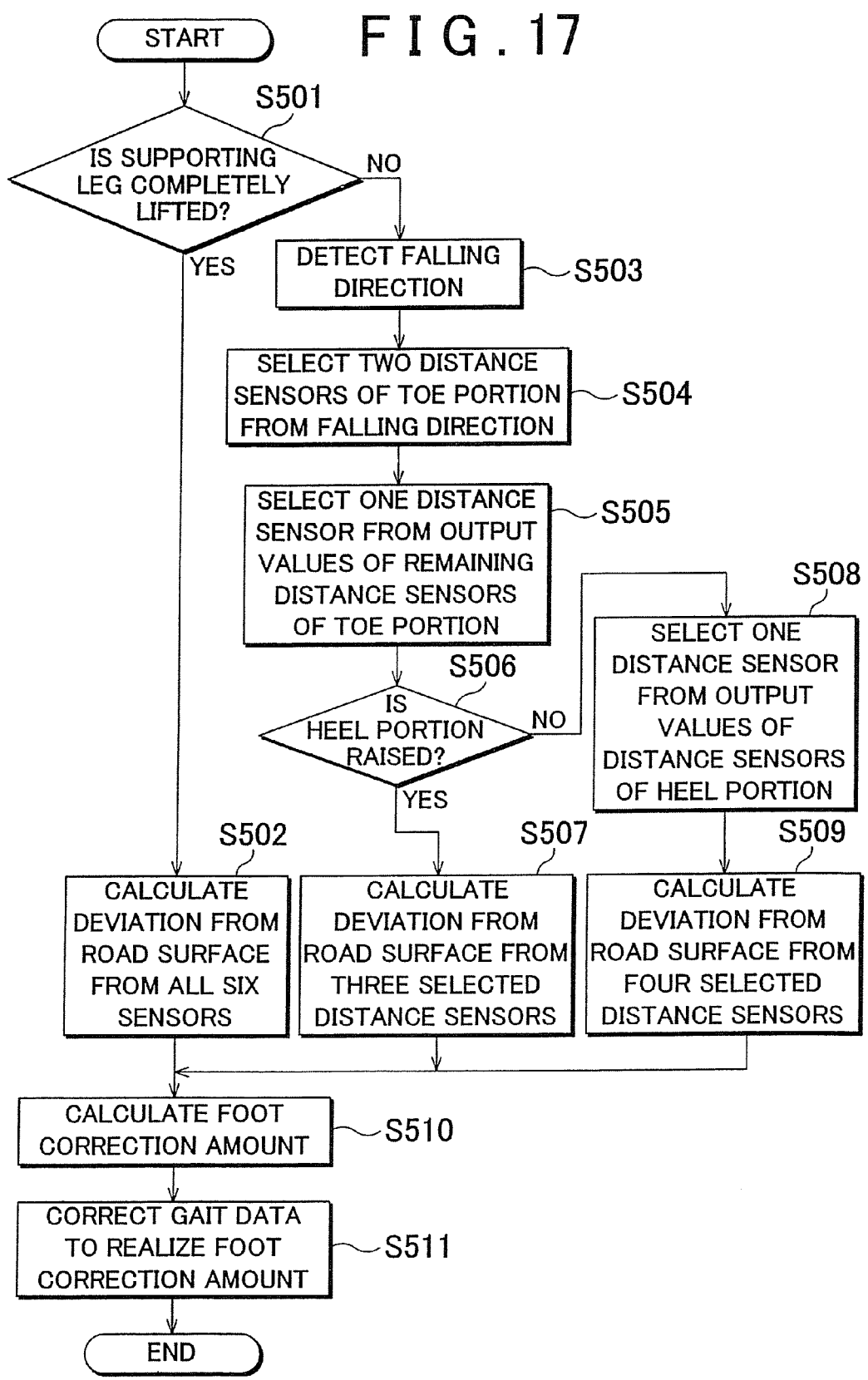
FIG. 17 is a flowchart illustrating an outline of control processing performed when the leg portion of the legged robot according to the second embodiment of the invention is in a lifted leg condition.
Figure 18:
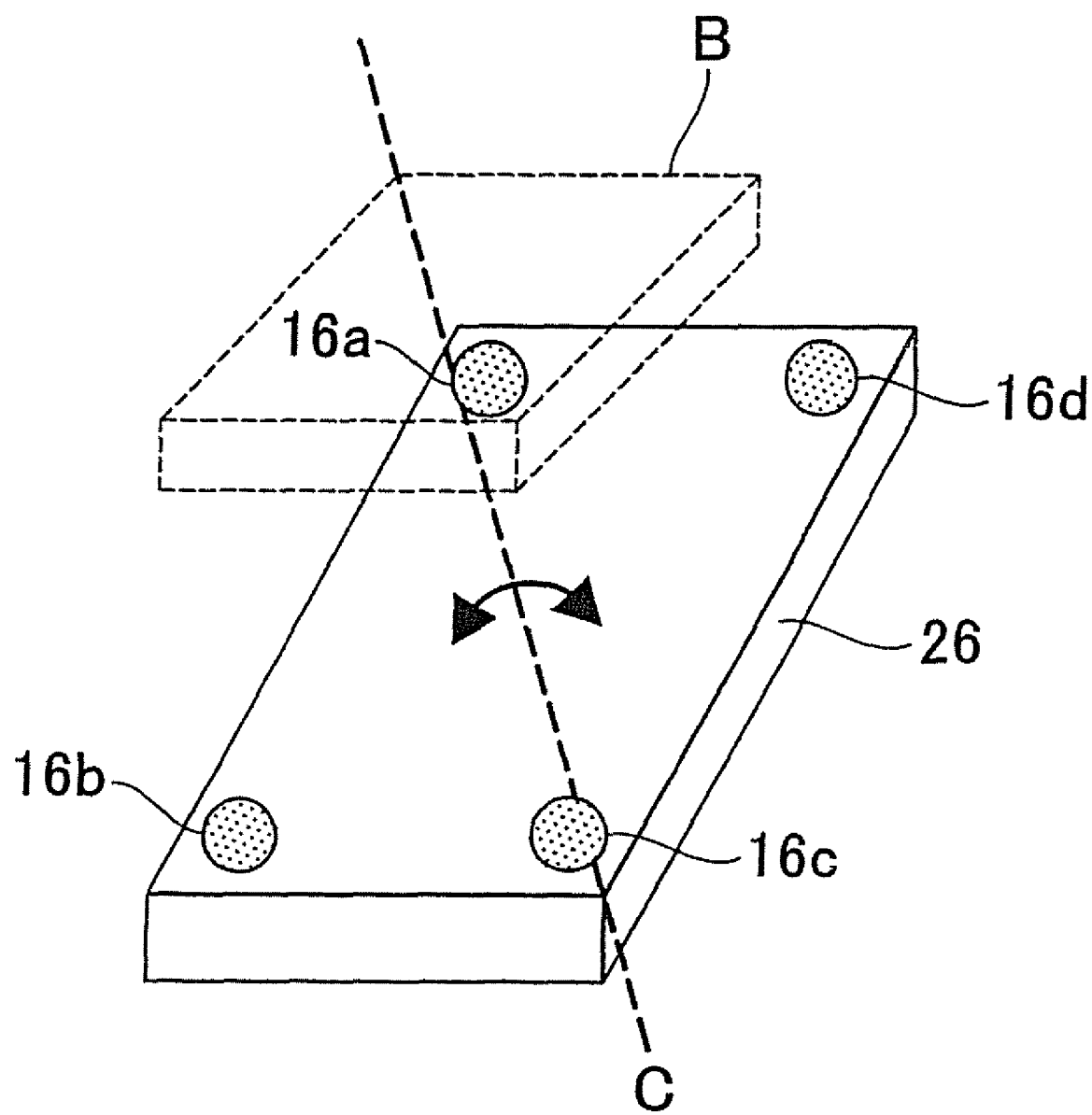
FIG. 18 is a view illustrating a state in which a part of a foot link of a legged robot is in contact with an obstacle.
Figure 19:
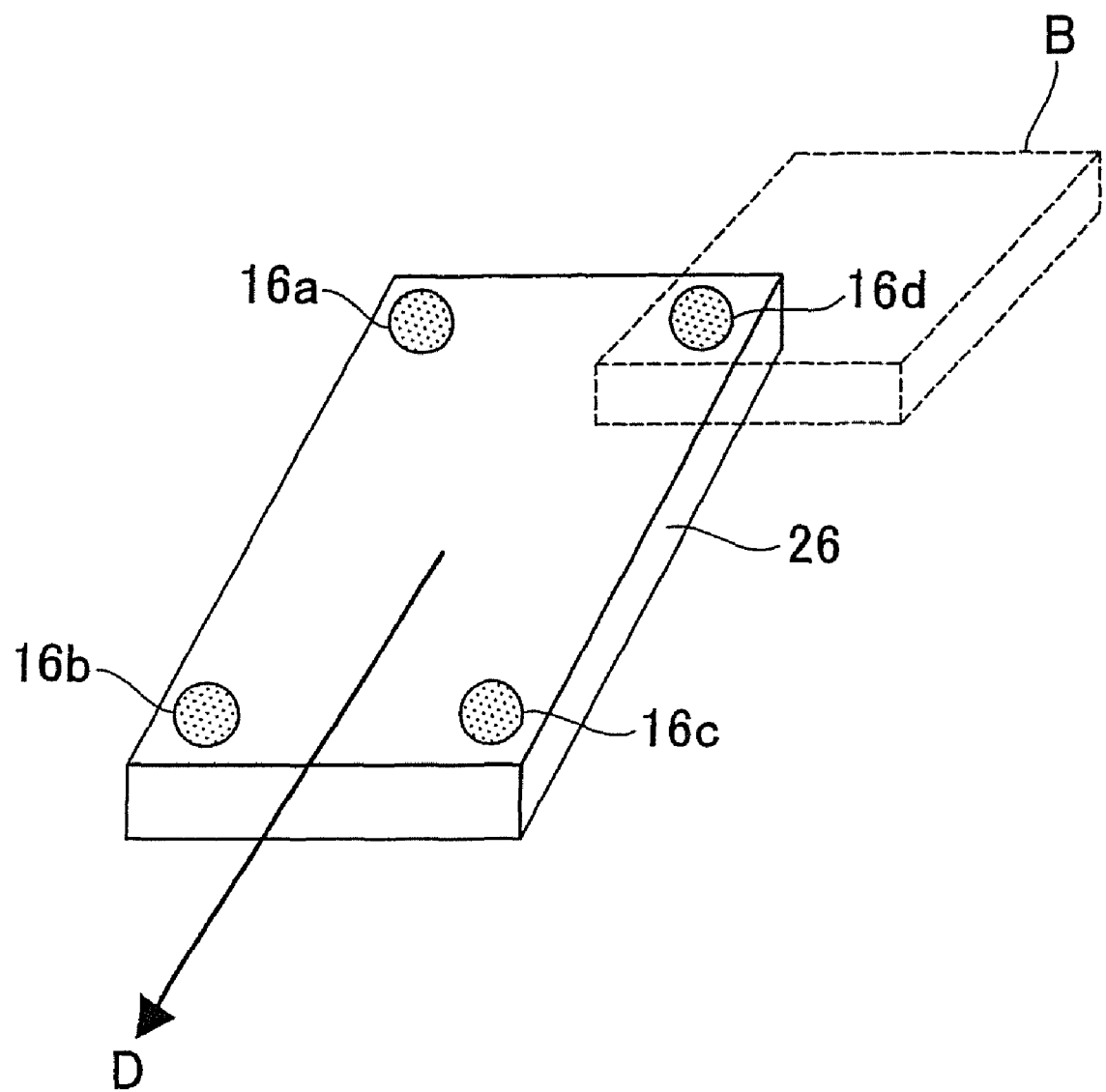
FIG. 19 is a view illustrating a state in which a part of a foot link of a legged robot is in contact with an obstacle.

Next, referring to FIGS. 13 to 17, control processing performed during a walking operation of the robot 100 according to the second embodiment will be described. FIG. 13 is a view illustrating the manner in which the robot 100 modifies the number of activated distance sensors according to the walking operation pattern during the walking operation. FIG. 14 is a flowchart illustrating an outline of control processing performed when the leg portion 20 of the robot 100 is in the supporting leg condition. FIG. 15 is a view illustrating a state in which a part of the toe portion 26a of the foot link 26 on the robot 100 is in contact with an obstacle B. FIG. 16 is a view illustrating transfer functions according to the second embodiment. FIG. 17 is a flowchart showing an outline of control processing performed when the leg portion 20 of the robot 100 is in the lifted leg condition.

As shown in FIG. 13, the robot 100 modifies the number of activated distance sensors, from among the distance sensors disposed on the foot link 26, in accordance with the walking operation pattern. The robot 100 is capable of differentiating between a walking operation pattern in which the leg portion 20 serves as the supporting leg and a walking operation pattern in which the leg portion 20 serves as the lifted leg. The robot 100 may also be constituted to detect whether the supporting leg is completely grounded and whether the lifted leg is completely lifted either based on the gait data or from the output values of the distance sensors 16, for example.

As a rule, when the leg portion 20 is in the supporting leg condition, three of the distance sensors disposed on the toe portion 26a are activated (in FIG. 13, a section extending from $t_3$ to $t_5$ with respect to the left foot distance sensors 16L when the left leg portion 20L is in the supporting leg condition, for example). Note, however, that when the heel portion 26b is in contact with the road surface in addition to the toe portion 26a, three of the distance sensors 16 disposed on the toe portion 26a are selected and one of the distance sensors 16 disposed on the heel portion 26b is selected such that a total of four distance sensors 16 are activated (in FIG. 13, a section extending from $t_2$ to $t_3$ with respect to the left foot distance sensors 16L, for example). Until the entire foot link 26 is completely grounded on the road surface such that the leg portion 20 enters the supporting leg condition, all of the distance sensors 16 (six distance sensors in the drawing) are activated (in FIG. 13, a section extending from $t_1$ to $t_2$ with respect to the left foot distance sensors 16L, for example).

As a rule, when the leg portion 20 is in the lifted leg condition, all of the distance sensors 16 (six distance sensors in the drawings) are activated (in FIG. 13, the section extending from $t_2$ to $t_5$ with respect to the right foot distance sensors 16R when the right leg portion 20R is in a lifted leg condition, for example). Note, however, that when both the toe portion 26a and the heel portion 26b are in contact with the road surface, three of the distance sensors 16 disposed on the toe portion 26a are selected and one of the distance sensors 16 disposed on the heel portion 26b is selected such that a total of four distance sensors 16 are activated (in FIG. 13, a section extending from $t_5$ to $t_6$ with respect to the right foot distance sensors 16R, for example). When the toe portion 26a is in contact with the road surface and the heel portion 26b is raised, three of the distance sensors disposed on the toe portion 26a are activated (in FIG. 13, a section extending from $t_6$ to $t_8$ with respect to the right foot distance sensors 16R, for example).

Hence, while the leg portion 20 shifts from the lifted leg condition to the supporting leg condition, all of the distance sensors are activated initially, whereupon the number of activated distance sensors is reduced in a stepped fashion. Once the sole is completely grounded, thereby entering the supporting leg condition, the minimum required number of distance sensors (three distance sensors in the drawing) is activated (in FIG. 13, the section extending from $t_2$ to $t_8$ with respect to the right foot distance sensors 16R, i.e. a period during which the right leg portion 20R, for example, is grounded completely on the road surface from the lifted leg condition, thereby entering the supporting leg condition).

Note that the time points $t_2$ and $t_8$ represent a point in time at which the right leg portion 20R serving previously as the supporting leg has completely left the ground and the left leg portion 20L serving previously as the lifted leg is completely grounded. The time point $t_5$ represents a point in time at which the right leg portion 20R serving previously as the lifted leg is completely grounded and the left leg portion 20L serving previously as the supporting leg has completely left the ground. The time points $t_3$ and $t_5$ represent a point in time at which the heel portion 26b of the leg portion 20 serving previously as the supporting leg has completely left the ground.

Control processing performed when the leg portion 20 of the robot 100 is in the supporting leg condition will now be described using the flowchart shown in FIG. 14. It is assumed that during the control processing shown in FIG. 14, a part of the foot link 26 of the robot 100 is in contact with the obstacle B on uneven ground. FIG. 15 is a view illustrating a state in which a part of the toe portion 26a of the robot 100 is in contact with the obstacle B. In FIG. 15, the overall position/attitude to be realized by the robot 100 is indicated by broken lines. The robot 100 controls its position/attitude in the direction of an arrow C to realize the target position/attitude indicated by the broken lines.

First, a determination is made as to whether the leg portion 20 is completely grounded following a process for shifting one of the leg portions 20 from the lifted leg condition to the supporting leg condition, which is performed during a walking operation of the robot 100 (step S401). When the determination result indicates that the leg portion 20 is completely grounded (i.e. the leg portion 20 is in the supporting leg condition), three distance sensors 16 are selected from the four distance sensors 16 disposed on the toe portion 26a, as described above. In other words, the falling direction of the robot 100 is detected (step S402). Next, two distance sensors 16 are selected from the four distance sensors 16 disposed on the toe portion 26a based on the falling direction (step S403). Next, one distance sensor 16 is selected from the remaining distance sensors 16 disposed on the toe portion 26a based on the distance between the sole and the road surface (step S404). Note that the method of selecting three distance sensors 16 from the four distance sensors 16 disposed on the toe portion 26a based on the falling direction is similar to the method of selecting three distance sensors 16 from the four distance sensors 16 disposed on the foot link 26 in the first embodiment, and hence description of this method has been omitted.

Next, a determination is made as to whether the heel portion 26b is raised, i.e. not in contact with the road surface (step S405). When the determination result indicates that the heel portion 26b is raised, i.e. not in contact with the road surface (when only the toe portion 26a is in contact with the road surface such that the robot 100 is on tiptoe), the foot deviation from the road surface is calculated from the three distance sensors 16 selected in the steps S403 and S404 (step S406). Here, the foot deviation (roll, pitch, z) between the target position/attitude of the toe portion 26a and the actual position/attitude is set as ($\Delta\phi$, $\Delta\theta$, $\Delta z$). Note that z indicates the vertical direction measurement height. For example, when the three distance sensors 16a, 16b, 16c are selected, the foot deviation can be calculated using the following conversion equation. According to the conversion matrix shown in the following equation, the foot deviation can be determined uniquely from deviations ($\Delta z_1$, $\Delta z_2$, $\Delta z_3$, $\Delta z_4$) in the output values of the respective distance sensors 16 and a three-row, four-column conversion matrix corresponding to the deviations of the respective distance sensors 16 using approximation from the geometrical relationship between the sole and the disposal positions of the distance sensors 16. Note that the value of each element in the conversion matrix differs according to the selected distance sensor.

$$\begin{pmatrix} \Delta\phi \\ \Delta\theta \\ \Delta z \end{pmatrix} = \begin{pmatrix} X_{11} & X_{12} & X_{13} & 0 \\ X_{21} & X_{22} & X_{23} & 0 \\ X_{31} & X_{32} & X_{33} & 0 \end{pmatrix} \begin{pmatrix} \Delta z_1 \\ \Delta z_2 \\ \Delta z_3 \\ \Delta z_4 \end{pmatrix} \quad \text{[Equation 5]}$$

If the determination result indicates that the heel portion 26b is grounded, i.e. in contact with the road surface (both the toe portion 26a and the heel portion 26b are in contact with the road surface), on the other hand, first, one distance sensor 16 is selected from the two distance sensors 16 disposed on the heel portion 26b based on the distance between the sole and the road surface (step S407). More specifically, the distance sensor 16 having the smallest measurement height is selected from the two distance sensors 16e and 16f provided on the heel portion 26b.

Next, the foot deviation from the road surface is calculated from the four distance sensors 16 selected in the steps S403, S404 and S407 (step S408). Here, the foot deviation (roll, pitch, z, toe) between the target position/attitude of the toe portion 26a and the actual position/attitude is set as ($\Delta\phi$, $\Delta\theta$, $\Delta z$, $\Delta\theta_{toe}$). Note that $\Delta\theta_{toe}$ indicates a rotation angle deviation of the toe portion 26a relative to the toe joint 27. For example, when three distance sensors 16a, 16b, 16c are selected from the toe portion 26a and one distance sensor 16e is selected from the heel portion 26b, the foot deviation can be calculated using the following conversion equation. According to the conversion matrix shown in the following equation, the foot deviation can be determined uniquely from deviations ($\Delta z_1$, $\Delta z_2$, $\Delta z_3$, $\Delta z_4$, $\Delta z_5$, $\Delta z_6$) in output values corresponding respectively to the distance sensors 16a to 16f and a four-row, six-column conversion matrix corresponding to the deviations of the respective distance sensors 16 using approximation from the geometrical relationship between the sole and the disposal positions of the distance sensors 16. Note that the value of each element in the conversion matrix differs according to the selected distance sensor.

$$\begin{pmatrix} \Delta\phi \\ \Delta\theta \\ \Delta z \\ \Delta\theta_{toe} \end{pmatrix} = \begin{pmatrix} X_{11} & X_{12} & X_{13} & 0 & X_{15} & 0 \\ X_{21} & X_{22} & X_{23} & 0 & X_{25} & 0 \\ X_{31} & X_{32} & X_{33} & 0 & X_{35} & 0 \\ X_{41} & X_{42} & X_{43} & 0 & X_{45} & 0 \end{pmatrix} \begin{pmatrix} \Delta z_1 \\ \Delta z_2 \\ \Delta z_3 \\ \Delta z_4 \\ \Delta z_5 \\ \Delta z_6 \end{pmatrix}$$ [Equation 6]

If the determination result of the step S401 indicates that the leg portion 20 is not completely grounded (i.e. that the leg portion 20 is not yet in the supporting leg condition), on the other hand, all of the distance sensors 16 disposed on the toe portion 26a and the heel portion 26b are activated, and the foot deviation from the road surface is calculated from all of the distance sensors 16 (step S409). When all of the six distance sensors 16a, 16b, 16c, 16d, 16e, 16f are activated, for example, the foot deviation can be calculated using the following conversion equation.

$$\begin{pmatrix} \Delta\phi \\ \Delta\theta \\ \Delta z \\ \Delta\theta_{toe} \end{pmatrix} = \begin{pmatrix} X_{11} & X_{12} & X_{13} & X_{14} & X_{15} & X_{16} \\ X_{21} & X_{22} & X_{23} & X_{24} & X_{25} & X_{26} \\ X_{31} & X_{32} & X_{33} & X_{34} & X_{35} & X_{36} \\ X_{41} & X_{42} & X_{43} & X_{44} & X_{45} & X_{46} \end{pmatrix} \begin{pmatrix} \Delta z_1 \\ \Delta z_2 \\ \Delta z_3 \\ \Delta z_4 \\ \Delta z_5 \\ \Delta z_6 \end{pmatrix}$$ [Equation 7]

Next, the foot correction amount for actually correcting the gait data is calculated using the foot deviation calculated in any of the steps S406, S408 and S409 (step S410). The foot correction amount can be calculated through a transfer function having the foot deviation as input and the foot correction amount as output, for example. FIG. 16 is a view illustrating transfer functions having the foot deviation as input and the foot correction amount as output. As shown in the drawing, with respect to the foot correction amount (roll), the roll deviation $\Delta\phi$ is passed through a transfer function $C_\phi$(s). With respect to the foot correction amount (pitch), the pitch deviation $\Delta\theta$ is passed through a transfer function $C_\theta$(s). With respect to the foot correction amount (z), the z deviation $\Delta z$ is passed through a transfer function $C_z$(s). With respect to the foot correction amount (toe), the toe deviation $\Delta\theta_{toe}$ is passed through a transfer function $C_{\theta toe}$(s). Note that in a case where the employed distance sensors are switched such that the foot deviation becomes discontinuous, these transfer functions preferably have a characteristic whereby a high-frequency gain is reduced.

The robot 100 then corrects the gait data to realize the foot correction amount calculated in the step S410 (step S411). When the operation is to be continued, the robot 100 then returns to the step S401 and continues the processing, and when the operation is to be terminated, the robot 100 terminates the processing.

As a rule, when the leg portion 20 is in the supporting leg condition, three of the distance sensors disposed on the toe portion 26a are activated. When the heel portion 26b contacts the road surface in addition to the toe portion 26a, three distance sensors 16 are selected among the distance sensors 16 disposed on the toe portion 26a and one distance sensor 16 is selected among the distance sensors 16 disposed on the heel portion 26b such that a total of four distance sensors 16 are activated. Until the entire foot link 26 is completely grounded on the road surface such that the leg portion 20 enters the supporting leg condition, all of the distance sensors 16 (six distance sensors in the drawing) are activated. By activating all sensors until the foot link 26 is completely grounded on the road surface, the foot link 26 can be aligned with the road surface quickly. As a result, outside disturbances during grounding can be suppressed effectively.

Next, control processing performed when the leg portion 20 of the robot 100 is in the lifted leg condition will be described using the flowchart shown in FIG. 17. First, a determination is made as to whether the leg portion 20 has completely left the ground following a process for shifting one of the leg portions 20 from the supporting leg condition to the lifted leg condition, which is performed during a walking operation of the robot 100 (step S501). When the determination result indicates that the leg portion 20 has completely left the ground (i.e. that the leg portion 20 is in the lifted leg condition), all of the distance sensors 16 are activated and the foot deviation from the road surface is calculated from all of the distance sensors 16, as described above (step S502).

If the determination result of the step S501 indicates that the leg portion 20 has not completely left the ground (i.e. that the leg portion 20 is not yet in the lifted leg condition), on the other hand, three distance sensors 16 are selected from the four distance sensors 16 disposed on the toe portion 26a, as described above. In other words, the falling direction of the robot 100 is detected (step S503). Next, two distance sensors 16 are selected from the four distance sensors 16 disposed on the toe portion 26a based on the falling direction (step S504). Next, one distance sensor 16 is selected from the remaining distance sensors 16 disposed on the toe portion 26a based on the distance between the sole and the road surface (step S505). Note that the method of selecting three distance sensors 16 from the four distance sensors 16 disposed on the toe portion 26a based on the falling direction is similar to the method of selecting three distance sensors 16 from the four distance sensors 16 disposed on the foot link 26 in the first embodiment, and hence description of this method has been omitted.

Next, a determination is made as to whether the heel portion 26b is raised, i.e. not in contact with the road surface (step S506). When the determination result indicates that the heel portion 26b is raised, i.e. not in contact with the road surface (when only the toe portion 26a is in contact with the road surface such that the robot 100 is on tiptoe), the foot deviation from the road surface is calculated from the three distance sensors 16 selected in the steps S504 and S505 (step S507).

If the determination result indicates that the heel portion 26b is grounded, i.e. in contact with the road surface (both the toe portion 26a and the heel portion 26b are in contact with the road surface), on the other hand, first, one distance sensor 16 is selected from the two distance sensors 16 disposed on the heel portion 26b based on the distance between the sole and the road surface (step S508). More specifically, the distance sensor 16 having the smallest measurement height is selected from the two distance sensors 16e and 16f provided on the heel portion 26b. Next, the foot deviation from the road surface is calculated from the four distance sensors 16 selected in the steps S504, S505 and S508 (step S509).

Next, the foot correction amount for actually correcting the gait data is calculated using the foot deviation calculated in any of the steps S502, S507 and S509 (step S510). The robot 100 then corrects the gait data to realize the foot correction amount calculated in the step S510 (step S511). When the operation is to be continued, the robot 100 then returns to the step S501 and continues the processing, and when the operation is to be terminated, the robot 100 terminates the processing.

Until the lifted leg has completely left the ground, the sole and the road surface remain in contact, and therefore, by selecting and activating three distance sensors in this manner, the correction amount of the supporting leg is held. Further, by selecting and activating all of the distance sensors once the lifted leg has completely left the ground, the lifted leg can be aligned in a direction avoiding the road surface quickly, even after contacting the road surface.

As described above, by detecting the falling direction of the robot 100 and selecting three sole distance sensors 16 from the toe portion 26a and one distance sensor 16 from the heel portion 26b to attain the target value based on the detection result, contact between the sole and the road surface can be maintained while effectively obtaining a floor reaction force moment for righting the trunk (body 10) of the robot 100. Hence, by receiving the floor reaction force moment from the sole while keeping the supporting leg in close contact with the floor surface, stabilization control for righting the trunk of the robot 100 can be executed easily, and as a result, the robot 100 can walk over uneven ground without falling over.

In the embodiments described above, the robot 100 has two legs, but the invention is not limited thereto, and may be applied to a legged robot having at least two legs, in which foot portions are provided on the respective lower ends of the legs and at least three distance sensors are provided on the soles of the foot portions.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

The invention claimed is:
1. A legged robot comprising:
  a body;
  a leg portion that is connected to the body;
  a foot portion that is provided on a lower end of the leg portion;
  a falling direction detection unit that detects a falling direction of the body;
  a control unit that controls drive of a joint of the leg portion based on gait data; and
  a distance detection unit that detects a distance between a sole of the foot portion and a road surface, wherein:
  the distance detection unit includes at least three distance sensors which are provided on the sole of the foot portion;
  the control unit has a distance sensor selecting section that selects a distance sensor and a gait data correcting section that corrects the gait data based on a detection signal from the distance sensor selected by the distance sensor selecting section; and
  the distance sensor selecting section selects three distance sensors among the distance sensors based on a detection result of the falling direction detection unit.

2. The legged robot according to claim 1, wherein the distance sensor selecting section selects a first distance sensor and a second distance sensor among the distance sensors based on the detection result of the falling direction detection unit, and selects a third distance sensor among the unselected distance sensors based on the distance between the sole of the foot portion and the road surface.

3. The legged robot according to claim 2, wherein the third distance sensor is a distance sensor, among the unselected distance sensors, in which the distance between the sole of the foot portion and the road surface is smallest.

4. The legged robot according to claim 1, wherein the control unit calculates a deviation value between the sole and the road surface based on detection signals from all of the selected distance sensors, and calculates a foot correction amount for correcting the gait data by using the deviation value.

5. The legged robot according to claim 1, wherein the control unit determines whether a walking operation pattern of the leg portion is a supporting leg walking operation pattern or a lifted leg walking operation pattern, and varies the number of distance sensors to be selected by the distance sensor selecting device based on the determination result of the walking operation pattern of the leg portion.

6. The legged robot according to claim 1, wherein, when the leg portion is a supporting leg, the control unit determines whether the sole of the leg portion is completely grounded on the road surface based on an output signal from the distance detection unit, and
  the distance sensor selecting section selects three distance sensors among the distance sensors based on the detection result of the falling direction detection unit when the sole of the leg portion is completely grounded on the road surface whereas selecting all of the distance sensors when the sole of the leg portion is not completely grounded on the road surface.

7. The legged robot according to claim 1, wherein, when the leg portion is a supporting leg, the control unit determines whether the sole of the leg portion is completely grounded on the road surface based on the gait data, and
  the distance sensor selecting section selects three distance sensors among the distance sensors based on the detection result of the falling direction detection unit when the sole of the leg portion is completely grounded on the road surface whereas selecting all of the distance sensors when the sole of the leg portion is not completely grounded on the road surface.

8. The legged robot according to claim 1, wherein, when the leg portion is a lifted leg, the control unit determines whether the sole of the leg portion is completely lifted off the road surface based on the output signal of the distance detection unit, and the distance sensor selecting section selects three distance sensors among the distance sensors based on the detection result of the falling direction detection unit when the sole of the leg portion is not completely lifted off the road surface whereas selecting all of the distance sensors when the sole of the leg portion is completely lifted off the road surface.

9. The legged robot according to claim 1, wherein, when the leg portion is a lifted leg, the control unit determines whether the sole of the leg portion is completely lifted off the road surface based on the gait data, and the distance sensor selecting section selects three distance sensors among the distance sensors based on the detection result of the falling direction detection unit when the sole of the leg portion is not completely lifted off the road surface whereas selecting all of the distance sensors when the sole of the leg portion is completely lifted off the road surface.

10. A control method of a legged robot including a body, a leg portion that is connected to the body, a foot portion that is provided on a lower end of the leg portion, a falling direction detection unit that detects a falling direction of the body, and at least three distance sensors that detect a distance between a sole of the foot portion and a road surface, the control method comprising:

selecting a first distance sensor and a second distance sensor among the distance sensors based on a detection result of the falling direction detection unit;

selecting a third distance sensor among the unselected distance sensors based on the distance between the sole of the foot portion and the road surface; and controlling drive of a joint of the leg portion based on the gait data by correcting gait data based on detection signals from the selected distance sensors.

* * * * *